(12) United States Patent
Wang et al.

(10) Patent No.: US 12,386,240 B2
(45) Date of Patent: Aug. 12, 2025

(54) ELECTROCHROMIC APERTURE AND MANUFACTURING METHOD THEREFOR, AND LENS MODULE HAVING ELECTROCHROMIC APERTURE

(71) Applicant: SHENZHEN GUANGYI TECH CO., LTD., Guangdong (CN)

(72) Inventors: Kun Wang, Guangdong (CN); Jiazhi He, Guangdong (CN)

(73) Assignee: SHENZHEN GUANGYI TECH CO., LTD., Guangdong (CN)

( * ) Notice: Subject to any disclaimer, the term of this patent is extended or adjusted under 35 U.S.C. 154(b) by 364 days.

(21) Appl. No.: 17/780,942

(22) PCT Filed: Nov. 27, 2020

(86) PCT No.: PCT/CN2020/132138
§ 371 (c)(1),
(2) Date: May 27, 2022

(87) PCT Pub. No.: WO2021/104426
PCT Pub. Date: Jun. 3, 2021

(65) Prior Publication Data
US 2023/0040208 A1    Feb. 9, 2023

(30) Foreign Application Priority Data

Nov. 29, 2019 (CN) .......................... 201911205739.5

(51) Int. Cl.
*G03B 9/02* (2021.01)
*C03C 15/00* (2006.01)
(Continued)

(52) U.S. Cl.
CPC ............. *G03B 9/02* (2013.01); *G02F 1/1533* (2013.01); *G02F 1/157* (2013.01); *G02F 1/163* (2013.01);
(Continued)

(58) Field of Classification Search
CPC .. G02F 2201/56; G02F 2202/16; G02F 1/155; G02F 1/163; G02F 1/157;
(Continued)

(56) References Cited

U.S. PATENT DOCUMENTS 6,426,492 B1    7/2002 Bos et al.
7,518,776 B2 *  4/2009 Chen ................. G02F 1/153
                                           359/267

(Continued)

FOREIGN PATENT DOCUMENTS

CN    104238223 A    12/2014
CN    104834146 A    8/2015
(Continued)

OTHER PUBLICATIONS

International Search Report of International Application No. PCT/CN2020/132138, Feb. 3, 2021.
(Continued)

*Primary Examiner* — Xi Wang
(74) *Attorney, Agent, or Firm* — TechLaw Ventures, PLLC; Terrence J. Edwards

(57) ABSTRACT

An electrochromic aperture, which comprises a first transparent substrate (11), a first transparent conductive layer (12), an ion storage layer (13), an ion transfer layer (14), an electrochromic layer (15), a second transparent conductive layer (16), and a second transparent substrate (17). The ion transfer layer (14) is a solid electrolyte layer. Also provided is a method for manufacturing the electrochromic aperture, relating to an etching operation after coating on the ion storage layer (13) and the electrochromic layer (15) is finished. Also provided is a lens modules having the electrochromic aperture.

34 Claims, 5 Drawing Sheets

(51) Int. Cl.
  *C03C 17/42* (2006.01)
  *G02F 1/15* (2019.01)
  *G02F 1/153* (2006.01)
  *G02F 1/157* (2006.01)
  *G02F 1/163* (2006.01)
  *H04N 23/71* (2023.01)
  *H04N 23/72* (2023.01)

(52) U.S. Cl.
  CPC ............ *H04N 23/71* (2023.01); *H04N 23/72* (2023.01); *C03C 15/00* (2013.01); *C03C 17/42* (2013.01); *C03C 2217/231* (2013.01); *C03C 2217/948* (2013.01); *C03C 2218/116* (2013.01); *G02F 2001/164* (2019.01); *G02F 2201/56* (2013.01); *G02F 2202/16* (2013.01)

(58) Field of Classification Search
  CPC ........ G02F 1/1533; G02B 7/02; H04N 23/71; H04N 23/72; G03B 9/02
  See application file for complete search history.

(56) References Cited

U.S. PATENT DOCUMENTS

| | | | |
|---|---|---|---|
| 9,759,984 | B1 | 9/2017 | Xu et al. |
| 2003/0227664 | A1 | 12/2003 | Agrawal et al. |
| 2004/0021853 | A1 | 2/2004 | Stam et al. |
| 2004/0047050 | A1* | 3/2004 | Bauer ............... H01L 27/14618 257/E31.118 |
| 2011/0051218 | A1 | 3/2011 | Georen et al. |
| 2011/0261430 | A1 | 10/2011 | Mazurkiewicz et al. |
| 2014/0192257 | A1* | 7/2014 | Gleason ................ H04N 23/73 348/363 |
| 2015/0241751 | A1 | 8/2015 | Noble et al. |
| 2016/0091768 | A1* | 3/2016 | Gleason ................ G02B 5/005 359/275 |
| 2016/0313537 | A1 | 10/2016 | Mercado |
| 2017/0374255 | A1 | 12/2017 | Campbell et al. |
| 2019/0227401 | A1 | 7/2019 | Yutani et al. |
| 2019/0241798 | A1 | 8/2019 | Igawa et al. |
| 2019/0285960 | A1 | 9/2019 | Sasa et al. |
| 2020/0406728 | A1* | 12/2020 | Zhong ..................... G02F 1/161 |
| 2022/0174764 | A1* | 6/2022 | Huang ................. H04W 76/14 |

FOREIGN PATENT DOCUMENTS

| | | |
|---|---|---|
| CN | 104865776 A | 8/2015 |
| CN | 104903788 A | 9/2015 |
| CN | 105131489 A | 12/2015 |
| CN | 105467711 A | 4/2016 |
| CN | 106997134 A | 8/2017 |
| CN | 107357107 A | 11/2017 |
| CN | 108519657 A | 9/2018 |
| CN | 110007539 A | 7/2019 |
| CN | 110133935 A | 8/2019 |
| CN | 110161769 A | 8/2019 |
| CN | 110873989 A | 3/2020 |
| EP | 2941668 B1 | 10/2018 |
| JP | H06317815 A | 11/1994 |
| JP | 2009116258 A | 5/2009 |
| JP | 2009169229 A | 7/2009 |
| JP | 2012098322 A | 5/2012 |
| JP | 2012128457 A | 7/2012 |
| JP | 2015014743 A | 1/2015 |
| JP | 2017111389 A | 6/2017 |
| KR | 10-2015-0104150 | 9/2015 |
| TW | 201812099 A | 4/2018 |
| WO | WO 2014107613 A2 | 7/2014 |
| WO | WO 2016063849 A1 | 4/2016 |

OTHER PUBLICATIONS

First Office Action received from the State Intellectual Property Office of People's Republic of China in Application No. CN201911205739.5.
First Office Action received from the State Intellectual Property Office of People's Republic of China in Application No. CN201911205739.5 (English Translation).
Search Report from the State Intellectual Property Office of People's Republic of China in Application No. CN2019112057395.
English Translation of CN104903788B prepared by Google Patents (https://patents.google.com/patent/CN104903788B/en?oq=CN104903788).
English Translation of CN105467711A prepared by Google Patents (https://patents.google.com/patent/CN105467711A/en?oq=CN105467711).
English Translation of CN108519657A prepared by Google Patents (https://patents.google.com/patent/CN108519657A/en?oq=CN108519657).
English Translation of CN110007539A prepared by Google Patents (https://patents.google.com/patent/CN110007539A/en?oq=CN110007539).
English Translation of CN110873989A prepared by Google Patents (https://patents.google.com/patent/CN110873989A/en?oq=CN110873989).
English Translation of JP2009116258A prepared by Google Patents (https://patents.google.com/patent/JP2009116258A/en?oq=JP2009116258).
English Translation of JP2012128457A prepared by Google Patents (https://patents.google.com/patent/JP2012128457A/en?oq=JP2012128457).
English Translation of JPH06317815A prepared by Google Patents (https://patents.google.com/patent/JPH06317815A/en?oq=JPH06317815).
English Translation of TW201812099A prepared by Google Patents (https://patents.google.com/patent/TW201812099A/en?oq=TW201812099).
English Translation of WO2016063849A1 prepared by Google Patents (https://patents.google.com/patent/JPWO2016063849A1/en?oq=WO2016063849).
English translation of WO 2016063849 prepared by Google Patents.
English translation of CN 104238223 prepared by Google Patents.
English translation of CN 104834146 prepared by Google Patents.
English translation of CN 104865776 prepared by Google Patents.
English translation of CN 105131489 prepared by Google Patents.
English translation of CN 106997134 prepared by Google Patents.
English translation of CN 107357107 prepared by Google Patents.
English translation of CN 110133935 prepared by Google Patents.
English translation of CN 110161769 prepared by Google Patents.
English translation of JP 2009169229 prepared by Google Patents.
English translation of JP 2012098322 prepared by Google Patents.
English translation of JP 2015014743 prepared by Google Patents.
English translation of JP 2017111389 prepared by Google Patents.
English translation of KR 10-2015-010415 prepared by Google Patents.
English translation of TW 201812099 prepared by Google Patents.
Li et al., "Research and Application of Chromic Materials," Modern Chemical Industry, Feb. 2004.
Zhang et al., "Research Progress and Development Tendency of VO2 Thin Film," Ordnance Material Science and Engineering, vol. 35, No. 4, Jul. 2012.
Sun et al., "Research Progress of Polymer Electrolyte Used in All Solid-State Electrochromic Device," Ordnance Material Science and Engineering, vol. 35, No. 4, Jul. 2012.

* cited by examiner

ELECTROCHROMIC APERTURE AND MANUFACTURING METHOD THEREFOR, AND LENS MODULE HAVING ELECTROCHROMIC APERTURE

TECHNICAL FIELD

The present application belongs to the technical field of color-transition apertures, and particularly relates to an electrochromic aperture, a preparation method thereof and a lens module comprising the same.

BACKGROUND

With the development of mobile devices technology such as mobile phone and tablet computer, most mobile devices are equipped with lens modules. Lens modules can be divided into two types: fixed aperture type and adjustable aperture type. The lens module with adjustable aperture usually has a mechanical aperture, and requires an aperture-controlling device with complex structure, which will result in a large volume of the lens module and put a high requirement on both production and fabrication processes. The lens module with fixed aperture has the advantage of simple structure, and the mobile device usually adopts the lens module with fixed aperture due to the limitation of size. However, the lens module with fixed aperture has a constant amount of light getting through, which has a very bad influence on the photo sharpness with strong light or weak light, and is unable to effectively control the depth of field and to shoot the effect of blurry background.

CN104903788A discloses an electro-optic aperture that has a stack comprising a front transparent conductor medium, an electrolyte medium, an active electro-chromic medium, and a rear transparent conductor medium, and wherein the front and rear transparent conductor mediums are directly connected to each other by a conductive section that is located within the imaging path. CN108519657A discloses a lens module and a mobile device, wherein the lens module includes a voltage-applying component, and the voltage-applying component is electrically connected with an electrochromic film, and the electrochromic film includes a first transparent conductive layer, an ion storage layer, an ion transfer layer, an electrochromic layer and a second transparent conductive layer arranged on a transparent substrate in sequence. The electro-optic aperture or electrochromic film described above can achieve changing light transmittance according to the difference electric field applied, so as to achieve the regulation of light throughput; and they have a small thickness, which will not significantly increase the Z-axis height of the lens module, and they are suitable for the camera module of portable consumer electronics.

However, the existing electrochromic apertures still have many shortcomings; for example, for the aperture of multi-level control, the conductive layer is usually etched with recesses, resulting in that the electrochromic layer or ion storage layer coated on the conductive layer is not smooth, and the aperture has uneven color-transition; the recess region doesn't have color-transition, which will cause light leakage or opacity, further affecting the quality of image formation; the aperture has an identical range of color-transition from inside to outside, and the adjustable luminous flux level numbers of aperture has insignificant differences; the aperture thickness is relatively large, which limits the aperture to apply to the camera module of portable consumer electronics, or the other shortcomings, all needed to be further addressed.

SUMMARY

The present application provides an electrochromic aperture, a preparation method thereof, and a lens module including the same. The preparation method provided by the present application can ensure that the aperture can achieve multi-level control while effectively avoiding the problem such as uneven color-transition caused by traditional etching method. The electrochromic apertures with different structures provided by the present application can achieve the aperture multi-level control while avoiding a problem of light leakage or opacity caused by etching recesses, or achieving the adjustment of aperture luminous flux level number in an extend range, and the electrochromic aperture of cambered structure can be combined with the achromatic lens combination to reduce the thickness of lens module.

The existing electrochromic aperture is usually etched with annular recesses on the transparent conductive layer, which divides the aperture into multiple regions from inside to outside, and each region can be independently controlled by applying voltage to achieve the multi-level control of the electrochromic aperture; the ion storage layer and the electrochromic layer are coated after the transparent conductive layer has been etched. However, this will lead the ion storage layer and the electrochromic layer to be rough at the recesses, and the color-transition will be uneven, affecting the quality of image formation. It should be noted that, the term "from inside to outside" refers to the radial direction on the film surface from the center to the edge in the present application.

In a first aspect, the present application provides an electrochromic aperture. The structure of the electrochromic aperture includes a first transparent substrate, a first transparent conductive layer, an ion storage layer, an ion transfer layer, an electrochromic layer, a second transparent conductive layer and a second transparent substrate stacked in sequence, wherein the ion transfer layer is a solid electrolyte layer.

In a preferred embodiment, on the ion storage layer and the first transparent conductive layer, and/or on the electrochromic layer and the second transparent conductive layer, a plurality of annular recesses are etched centering on the central axis of the electrochromic aperture.

In another preferred embodiment, on the two layers including the first transparent substrate and the first transparent conductive layer, or on the three layers including the first transparent substrate, the first transparent conductive layer and the ion storage layer, a plurality of annular recesses are etched centering on the central axis of the electrochromic aperture; and/or, on the two layers including the second transparent substrate and the second transparent conductive layer, or on the three layers including the second transparent substrate, and the second transparent conductive layer and the electrochromic layer, a plurality of annular recesses are etched centering on the central axis of the electrochromic aperture.

In a specific embodiment of the present application, a plurality of annular recesses centering on the central axis of the electrochromic aperture are etched on the first transparent conductive layer and the ion storage layer. In another specific embodiment of the present application, a plurality of annular recesses centering on the central axis of the electrochromic aperture are etched on the second transparent conductive layer and the electrochromic layer. In another specific embodiment of the present application, a plurality of annular recesses centering on the central axis of the electrochromic aperture are etched on the first transparent substrate and the first transparent conductive layer. In another specific embodiment of the present application, a plurality of annular recesses centering on the central axis of the electrochromic aperture are etched on the second transparent substrate and the second transparent conductive layer. In another specific embodiment of the present application, a plurality of annular recesses centering on the central axis of the electrochromic aperture are etched on the first transparent substrate, the first transparent conductive layer and the ion storage layer. In another specific embodiment of the present application, a plurality of annular recesses centering on the central axis of the electrochromic aperture are etched on the second transparent substrate, the second transparent conductive layer and the electrochromic layer.

In a second aspect, the present application provides the preparation method of the electrochromic aperture of the first aspect, which includes the following steps:

(1) forming the first transparent conductive layer on the first transparent substrate, and forming the second transparent conductive layer on the second transparent substrate;

(2) forming the ion storage layer on the first transparent conductive layer, and forming the electrochromic layer on the second transparent conductive layer;

(3) on the ion storage layer and the first transparent conductive layer, and/or on the electrochromic layer and the second transparent conductive layer, a plurality of annular recesses are etched centering on the central axis of the electrochromic aperture; and (4) combining the ion storage layer, the electrochromic layer and the ion transfer layer, and arranging the ion transfer layer between the ion storage layer and the electrochromic layer, so that the electrochromic aperture is obtain;

or, includes the following steps:

(1) forming the first transparent conductive layer on the first transparent substrate, and forming the second transparent conductive layer on the second transparent substrate;

(2) forming the ion storage layer on the first transparent conductive layer, and forming the electrochromic layer on the second transparent conductive layer;

(3) combining the ion storage layer, the electrochromic layer and the ion transfer layer, and arranging the ion transfer layer between the ion storage layer and the electrochromic layer; and (4) performing etching on the side of the first transparent substrate; on the two layers including the first transparent substrate and the first transparent conductive layer, or on the three layers including the first transparent substrate, the first transparent conductive layer and the ion storage layer, etching out a plurality of annular recesses centering on the central axis of the electrochromic aperture;

and/or performing etching on the side of the second transparent substrate; on the two layers including the second transparent substrate and the second transparent conductive layer, or on the three layers including the second transparent substrate, the second transparent conductive layer and the electrochromic layer, etching out a plurality of annular recesses centering on the central axis of the electrochromic aperture.

The present application has no particular limitation on the etching method; for example, laser etching can be used.

In such method, the etching operation is performed after the ion storage layer and the electrochromic layer have been coated, so that the problem caused by the traditional etching method, such as uneven color-transition, can be effectively avoided, while it is ensured that the aperture is capable of achieving multi-level control.

Although the preparation method according to the second aspect effectively avoids the problem caused by the traditional etching method, such as uneven color-transition, adopting the method of etching recesses will produce the region without color-transition at the recess region while realizing the multi-level color-transition of the electrochromic aperture, leading to light leakage or opacity, and further affecting the quality of image formation. Therefore, further improvement is still required.

In order to solve this problem, the present application provides an electrochromic aperture in a third aspect described below. Since the electrochromic layers in different electrochromic units of such electrochromic aperture have seamlessly connected projections along the central axis of the electrochromic aperture, and the different electrochromic units can be controlled independently in the color-transition process, the problem of light leakage or opacity caused by etching recesses is avoided while realizing the multi-level control of the aperture.

In a third aspect, the present application provides an electrochromic aperture, including at least two stacked and independent electrochromic units, in which each electrochromic unit includes a first transparent a conductive layer, an ion storage layer, an ion transfer layer, an electrochromic layer and a second transparent conductive layer stacked in sequence; and the adjacent electrochromic units are separated by a transparent substrate.

A shape of the electrochromic layer and the ion storage layer is a circle or an annulus centering on the central axis of the electrochromic aperture, and the ion storage layer and the electrochromic layer in the same electrochromic unit are aligned to each other, and the projections of the electrochromic layers in different electrochromic units along the central axis of the electrochromic aperture do not overlap and the boundaries are aligned to each other.

It should be noted that in this application, "the ion storage layer and the electrochromic layer in the same electrochromic unit are aligned to each other" means that in the same electrochromic unit, the ion storage layer and the electrochromic layer have overlapped projections along the central axis of the electrochromic aperture.

The present application has no particular limitation on the preparation method of the ion storage layer and the electrochromic layer having the shaped described above; for example, two methods are listed below.

1. Firstly, adopting a mask substrate of annular shape hollowed out to cover the transparent conductive layer, and coating the electrochromic layer or the ion storage layer on the top of the transparent conductive layer, and removing the mask substrate so as to obtain the annular electrochromic layer or the annular ion storage layer.

2. On the top of the transparent conductive layer that has been coated with the electrochromic layer or the ion storage layer, performing laser etching, chemical etching or physical scrubbing for the annular electrochromic layer and the annular ion storage layer.

In order to solve the problem of light leakage or opacity caused by etching recesses, the present application provided an electrochromic aperture in a fourth aspect described below. Taking the circumstance that the electrochromic aperture is divided into three regions from the inside to the outside, and for example, an onset bright-transition voltage is 0.4 V, 0.8 V and 1.2 V respectively, when the voltage is between 0.4 V to 0.8 V, only the innermost region starts to transition to bright; when the voltage is between 0.8 V to 1.2 V, the innermost and middle regions start to transition to bright; and when the voltage is greater than 1.2 V, the innermost, middle and outermost regions all start to transition to bright. When an onset dark-transition voltage of the aperture gradually decreases from inside to outside, applying a reverse voltage can force the outer ring of the aperture to begin dark-transition preceding the inner ring. Since the regions of the aperture are continuous from inside to outside, the problem of light leakage or opacity caused by the etching recess is avoided while realizing the multi-level control of the aperture.

In a fourth aspect, the present application provides an electrochromic aperture, comprising a first transparent substrate, a first transparent conductive layer, an ion storage layer, an ion transfer layer, an electrochromic layer, a second transparent conductive layer and a second transparent substrate stacked in sequence;

wherein, the onset bright-transition voltage of the electrochromic aperture gradually increases from inside to outside, or the onset dark-transition voltage of the electrochromic aperture gradually decreases from inside to outside.

In the present application, there is no specific limitation on the method for realizing "the onset bright-transition voltage of the electrochromic aperture gradually increases from inside to outside, or the onset dark-transition voltage of the electrochromic aperture gradually decreases from inside to outside". For example, two methods are listed below:

1. before ultraviolet curing of the ion transfer layer, making different regions using materials with different ultraviolet transmittance, so that a cross-linking degree of the ion transfer layer gradually increased from inside to outside; and 2. coating electrochromic materials having different voltages for starting to bright or dark transition on the transparent conductive layer, so that it can be ensured that from inside to outside, the electrochromic materials have the onset bright-transition voltage gradually increased or the onset dark-transition voltage gradually decreased.

In order to solve the problem of light leakage or opacity caused by etching recesses, the present application provides an electrochromic aperture in a fifth aspect described below. By using the electrochromic aperture according to the fifth aspect, and applying a high voltage to the center and a low voltage to the edge, the voltage of the aperture can be gradually reduced from inside to outside. Since the aperture hasn't been etched with recesses, and a transmittance of any point on the aperture is related to the voltage at that point, when the voltage of the aperture gradually decreases from inside to outside, the transmittance of the aperture will gradually decrease from inside to outside; by changing the voltage, it can be achieved that the transition of different transmittances of the aperture can be controlled, thereby avoiding the problem of light leakage or opacity caused by etching recesses while realizing multi-level control of the aperture.

In a fifth aspect, the present application provides an electrochromic aperture, comprising a first transparent substrate, a first transparent conductive layer, an ion storage layer, an ion transfer layer, an electrochromic layer, a second transparent conductive layer and a second transparent substrate stacked in sequence;

wherein, a material of the electrochromic aperture is identical from inside to outside, and the electrochromic aperture has no recess.

In a sixth aspect, the present application provides a method of multi-level control for the electrochromic aperture according to the fifth aspect. The method includes that with the electrochromic aperture according to the fifth aspect, applying different voltages to the electrochromic aperture at the center and the edge, in which the voltage at the center is greater than the voltage at the edge, realizing multi-level control.

It should be noted that the voltage applied to the aperture in the present application refers to the potential difference between the electrochromic layer and the ion storage layer. When the potential difference is positive, the applied voltage is positive, and when the potential difference is negative, the applied voltage is negative. The "the voltage at the center is greater than the voltage at the edge" means that the voltage value at the center is greater than the voltage value at the edge, for example, the circumstance may be a positive voltage at the center and a negative voltage at the edge; or both the center and the edge have a positive voltage, and the absolute voltage value at the center is greater than the absolute voltage value at the edge; or both the center and the edge have a negative voltage, and the absolute voltage value at the center is smaller than the absolute voltage value at the edge.

The excessive thickness of the aperture has always been the limitation on applying the aperture to the camera module of the portable consumer electronics. For an electrochromic aperture provided in a seventh aspect and an eighth aspect of the present application, by selecting the materials of each layer, the electrochromic aperture can be given a characteristic of flexibility, and can be designed as a cambered structure with the same curvature as the convex lens or concave lens in an achromatic lens combination; the aperture can be attached to the concave lens or convex lens surface of the achromatic lens combination, so as to achieve the combination of the aperture and lens in the lens module and further reduce the thickness of the lens module. Or the aperture can be designed to have the same shape as the concave lens or convex lens in the achromatic lens combination, thereby replacing the concave lens or the convex lens, achieving the combination of aperture and lens in the lens module, and further reducing the thickness of the lens module. Since the electrochromic aperture has remarkably little variation in the refractive index during the color-transition process, the achromatic function is not affected.

In a seventh aspect, the present application provides an electrochromic aperture, comprising a first transparent substrate, a first transparent conductive layer, an ion storage layer, an ion transfer layer, an electrochromic layer, a second transparent conductive layer and a second transparent substrate stacked in sequence;

wherein, the electrochromic aperture has a cambered structure, and the curvature is identical to the surface curvature of the concave lens or the convex lens in the achromatic lens combination.

In an eighth aspect, the present application provides an electrochromic aperture, comprising a first transparent substrate, a first transparent conductive layer, an ion storage layer, an ion transfer layer, an electrochromic layer, a second transparent conductive layer and a second transparent substrate stacked in sequence;

wherein, the shape of the electrochromic aperture is identical to the shape of the concave lens or the convex lens in the achromatic lens combination.

The existing electrochromic apertures are basically two-level control, that is, only two alternate forms in aperture luminous flux level number; even if a three-level is equipped, if the three annuluses have the same color-transition range (assuming that the color-transition range of each ring is 20% to 90%), the overall transmittance of its smallest pupil is still large, which will not only affect the image formation effect, but also give the insignificant difference among the adjustable luminous flux level numbers for the aperture, and that is, the ratio of the maximum pupil transmittance to the minimum pupil transmittance is relatively small, which needs to be improved.

For this problem, the present application provides an electrochromic aperture in a ninth aspect described below. By changing the thickness of electrochromic layer in different regions, the color-transition ranges of various region can be changed (for example, the electrochromic layer is divided into three regions from inside to outside, and the color-transition range of each region is 20% to 90%, 10% to 80%, and 5% to 70% in sequence), and the ratio of the maximum pupil transmittance to the minimum pupil transmittance can be greatly increased, so that the regulation of aperture luminous flux level number can be achieved in a greater difference and the requirements of diverse shooting scenes can be satisfied.

In a ninth aspect, the present application provides an electrochromic aperture, the structure of which is: based on the electrochromic aperture according to the first, third, fourth, fifth, seventh, and eighth aspects of the present application, further arranging the thickness of the electrochromic aperture, or the thickness of the electrochromic layer and the ion storage layer, to gradually increase from inside to outside.

A thickness ratio of the edge to the center may be 1.1 to 10:1; for example, it may be 1.1:1, 2:1, 3:1, 4:1, 5:1, 6:1, 7:1, 8:1:1, 9:1, 10:1, etc.

It should be noted that, since the thickness of the ion transfer layer is in the order of a micrometer, and the thickness change of the electrochromic layer is in the order of a nanometer, the actual thickness change of the ion transfer layer is negligible.

In the present application, the thickness of the electrochromic layer is arranged to gradually increase from inside to outside, so that the aperture has different color-transition ranges from inside to outside, thereby achieving the adjustment of the aperture luminous flux level number in a greater difference and satisfying the requirements of various shooting scenes.

In the present application, there is no specific limitation on the method for realizing the thickness change described above; for example, a film with uniform thickness can be prepared first, and then subjected to laser etching; or the thickness of film can be controlled during the preparation process (for example, performing control by layered coating).

In an embodiment of the present application, a material of the first transparent conductive layer and a material of the second transparent conductive layer are each independently selected from indium-tin oxide (ITO), aluminum zinc oxide (AZO), fluorine doped tin oxide (FTO), silver nanowire, graphene, carbon nanotube, metal mesh or silver nanoparticle.

In an embodiment of the present application, a thickness of the first transparent electrode and a thickness of the second transparent electrode are each independently selected from 1 nm to 1000 nm; for example, it may be 1 nm, 3 nm, 5 nm, 10 nm, 20 nm, 50 nm, 80 nm, 100 nm, 200 nm, 300 nm, 400 nm, 500 nm, 600 nm, 800 nm, or 1000 nm, etc.

The first transparent conductive layer and the second transparent conductive layer are the electrode of the electrochromic aperture, and in practical application, the electrode may be connected with a lead to be led out.

In an embodiment of the present application, a material of the ion storage layer is selected from one or a combination of at least two of oxides or complexes formed from a metal element in groups IIIB, IVB, VB, VIB, VIIB, VIII, IB and IIB, which can store ions during electrochemical reaction. For example, it may be a metal oxide, or a combination of at least two metal oxides, or a metal complex, or a combination of at least two metal complexes, or a combination of metal complex and metal oxide. When two or more metal oxides are selected, the circumstance refers to a doping form, for example, $Nb_2O_5$ doped with 5 wt. % $TiO_2$.

Preferably, the metal is selected from Ti, V, Nb, Ta, Cr, Mo, W, Mn, Fe, Co, Ir, Ni, Cu and Zn.

Preferably, the complex is selected from one or a combination of at least two of Prussian green, Prussian white, Prussian brown, Prussian blue, $KFeFe(CN)_6$, FeNiHCF, FeHCF, NiHCF or an iron compound of $X_mY_n\{Fe(CN)_6\}$, wherein X is $Na^+$, $K^+$ or metal ion mentioned in other literature, and Y is $Fe^{3+}$, $Co^{3+}$, $Ni^+$, $Mn^{2+}$, $Zn^{2+}$ or $Cu^{2+}$, or metal ion mentioned in other literature.

Preferably, a material of the ion storage layer further includes redox-active polymer.

The redox-active polymer may be a polymer formed from pyrrole and pyrrole derivative, a polymer formed from thiophene and thiophene derivative, a polymer containing tetramethylpiperidine nitroxide (TEMPO) and its derivative, a polymer containing viologen and its derivative, etc.

In an embodiment of the present application, the ion storage layer may be a composite system of a transition-metal complex and a metal oxide, a composite system of a transition-metal complex and a redox-active polymer, or a composite system of a metal oxide and a redox-active polymer, etc.

In an embodiment of the present application, a thickness of the ion storage layer is selected from 1 nm to 10000 nm; for example, it may be 1 nm, 3 nm, 5 nm, 10 nm, 20 nm, 50 nm, 80 nm, 100 nm, 200 nm, 300 nm, 400 nm, 500 nm, 600 nm, 800 nm, 1000 nm, 2000 nm, 5000 nm, 8000 nm, or 10000 nm, etc.

The ion storage layer is mainly used to store ions. When the electricity is applied, the ions of the ion storage layer are transferred to the electrochromic layer, and the electrochromic layer accepts these ions and changes color.

In an embodiment of the present application, the ion transfer layer is a solid flexible electrolyte layer.

In an embodiment of the present application, a neutral small organic molecule contained in the ion transfer layer has a weight percentage of less than or equal to 30 wt %, for example, 25 wt %, 20 wt %, 15 wt %, 10 wt %, 5 wt %, etc; the neutral small organic molecule has a molecular weight of less than or equal to 3000, for example, 2500, 2000, 1500, 1000, 500, etc.

In an embodiment of the present application, a polymer of the solid electrolyte layer is a solid electrolyte polymer, and the solid electrolyte polymer has plasticized groups connected by covalent bond.

In an embodiment of the present application, the solid electrolyte polymer is a copolymer of a monomer and an ion conducting polymer or a copolymer of an oligomer and an ion conducting polymer, wherein the monomer or the oligomer has plasticizable groups on the side chain; furthermore, a composition of the solid electrolyte layer further includes a monomer or an oligomer fragment with a cross-linking group on the side chain.

The term "furthermore" in the present application means that, for the limitation defined above, under the premise that the composition of the solid electrolyte layer includes a copolymer of a monomer and an ion conducting polymer or a copolymer of an oligomer and an ion conducting polymer, a copolymer further comprising a monomer or an oligomer fragment with a cross-linking group on the side chain is preferred; and the term "furthermore" hereinafter has the same interpretation.

The plasticized group and plasticizable group refer to a group that can weaken the interaction between polymers and suppress crystallization of polymers.

In an embodiment of the present application, the solid electrolyte polymer is a plasticized linear polymer and an ion conducting polymer, the two of which are linked by chemical bonds; the plasticized linear polymer has a glass transition temperature of less than −20° C.; furthermore, the composition of the solid electrolyte layer further includes a monomer or a polymer with a cross-linking group on the side chain; the three, including the monomer or polymer with a cross-linking group on the side chain, the plasticized linear polymer and the ion conducting polymer, are linked by chemical bonds.

In an embodiment of the present application, the solid electrolyte polymer includes a polymer, which has a plasticized group on the side chain and a glass transition temperature of less than −20° C., and an ion conducting polymer, the two of which are linked by chemical bonds; furthermore, the composition of the solid electrolyte layer further includes a monomer or a polymer with a cross-linking group on the side chain; the three, including the monomer or polymer with a cross-linking group on the side chain, the polymer with a plasticized group on the side chain and a glass transition temperature of less than −20° C. and the ion conducting polymer, are linked by chemical bonds.

In an embodiment of the present application, the solid electrolyte polymer is a brush polymer, in which the brush polymer has a soft main polymer chain, an ion conducting side chain and an non-miscible phase side chain; furthermore, the composition of the solid electrolyte layer further includes a monomer or a oligomer with cross-linking groups on their side chains, where the monomer or the oligomer with a cross-linking group on the side chain is linked with the brush polymers by chemical bonds in the form of block copolymerization.

The non-miscible phase side chain of the present disclosure refers to the side chain that highly differs from other side chains or polymers in properties, and cannot be blended effectively; the brush polymer provided in the present disclosure refers to the polymer with a soft main polymer chain and two kinds of side chains, in which one kind of side chain is used for ion conduction and the other kind of chain is highly different from ion conducting side chain in properties and cannot be effectively blended with other kinds of chains. By introducing such non-miscible side chain in the present application, the polymer can obtain a reduced crystallization, and be in a random state; therefore, the overall ion conducting ability and transparency of the polymers can be improved.

In an embodiment of the present application, the ion transfer layer is a solid flexible electrolyte layer. A polymer of the solid flexible electrolyte layer can be selected from the following four classes of polymers.

In a specific embodiment, x, y and z are each independently selected form an integer greater than 0. The rectangle shown in the formula represents the polymer block with ion-conducting function (ion-conducting polymer block), and the oval represents the monomer or polymer with a side chain including plasticized group (PR), or cross-linking group (CL), or non-miscible group (NM), or ion-conducting group (IC).

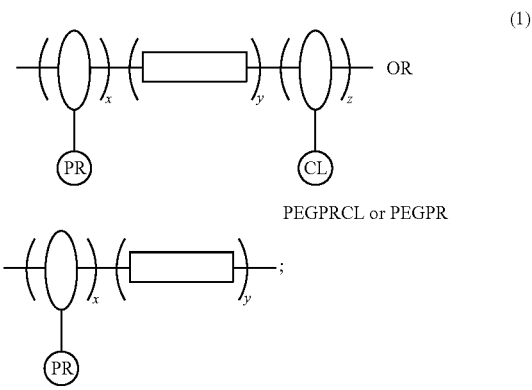

PEGPRCL or PEGPR

The ion conducting polymer block y (such as polyethylene glycol or other materials reported in literature), the monomer or polymer block x with plasticized groups (PR) on the side chain, and the monomer or polymer block z with cross-linking groups (CL) on the side chain are copolymerized to form a block copolymer (represented by PEGPRCL). Or the ion conducting polymer block y (such as polyethylene glycol or other materials reported in literature) and the monomer or polymer block x with plasticized groups (PR) on the side chain are copolymerized to form a block copolymer (represented by PEGPR).

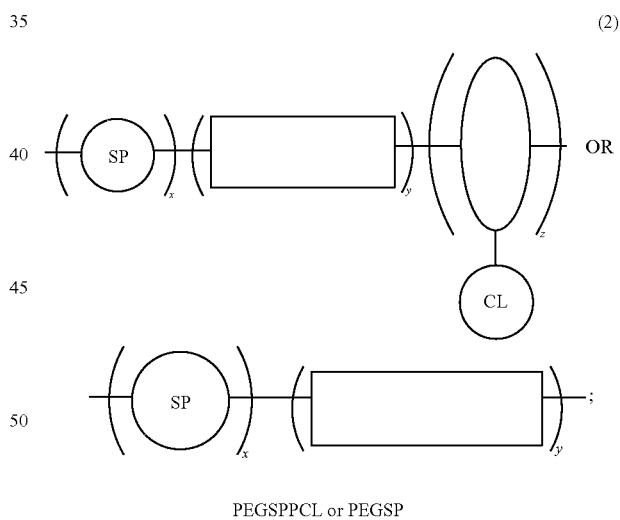

PEGSPPCL or PEGSP

The ion conducting polymer block y (such as polyethylene glycol or other materials reported in literature), the plasticized linear polymer (SP) block x with a glass transition temperature of less than −20° C. (such as polyethylene, polybutene, polyisobutylene, siloxane or other materials reported in literature), and the monomer or polymer block z with cross-linking groups (CL) on the side chain are copolymerized to form a block copolymer (represented by PEGSPCL). Or the ion conducting polymer block y (such as polyethylene glycol or other materials reported in literature) and the plasticized linear polymer (SP) block x with a glass transition temperature of less than −20° C. (such as polyethylene, polybutene, polyisobutylene, siloxane or other materials reported in literature) are linked through chemical reaction to form a block copolymer (represented by PEGSP).

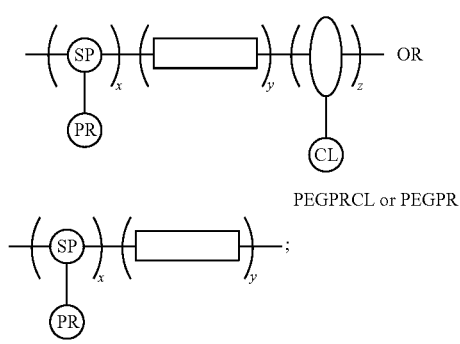

(3)

PEGPRCL or PEGPR

The ion conducting polymer block y (such as polyethylene glycol or other materials reported in literature) and the plasticized polymer (SP-PR) block x with plasticized side chain are linked through chemical reaction, and then subjected to copolymerization with the monomer or oligomer (CL) block z with cross-linking groups on the side chain to form a block copolymer (represented by PEGSP-PRCL). Or the ion conducting polymer block y (such as polyethylene glycol or other materials reported in literature) and the plasticized polymer block x with plasticized side chain (SP-PR) are linked through chemical reaction to form a block copolymer (represented by PEGSP-PR).

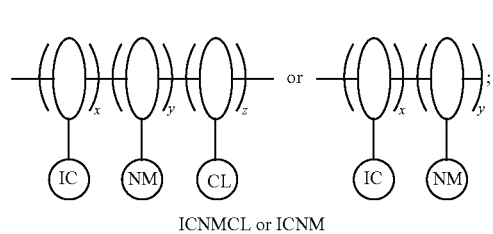

(4)

ICNMCL or ICNM

The flexible polymer block x with ion conducting oligomer or polymer (such as polyethylene glycol or other materials reported in literature) as the side chain, the flexible polymer block y with non-miscible side chains (such as alkyl, aryl or the side chains of both alkyl and aryl) that are immiscible with ion-conducting polymers are linked through chemical reaction, and then subjected to copolymerization with the monomer or oligomer block z with cross-linking groups (CL) on the side chain to form a brush block copolymers (ICNMCL). Or the flexible polymer block x with ion conducting oligomer or polymer (such as polyethylene glycol or other materials reported in literature) as the side chain, and the flexible polymer block y with non-miscible side chains (such as alkyl, aromatic or mixed alkyl and aromatic side chains) that are immiscible with ion-conducting polymers as the side chain are linked through chemical reaction to form a brush block copolymer (ICNM).

The polymer materials described above for the ion transfer layer should further be blended with a certain amount of an organic or inorganic salt to form an electrolyte precursor. The inorganic salt includes but is not limited to lithium salt, sodium salt, potassium salt, magnesium salt, calcium salt and aluminum salt; the organic salt includes but is not limited to ionic liquid such as EMITFSI and EMIOTF. Sometimes, it is also necessary to add an initiator for blending to form the electrolyte precursor, and the electrolyte precursor can be cross-linked to form the final solid electrolyte by heating, light initiation, etc.

In the present application, the plasticized group (PR) includes but is not limited to the following structure:

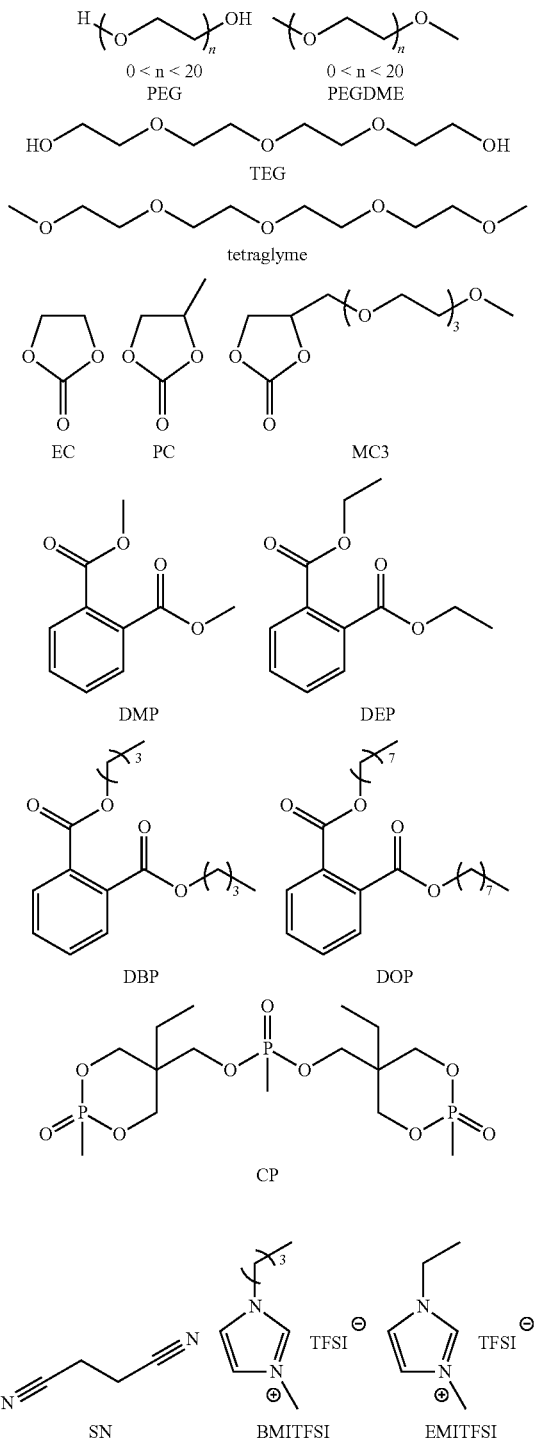

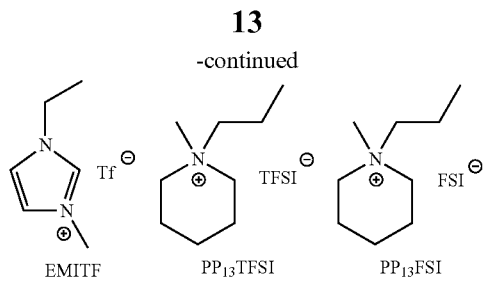

EMITF  PP₁₃TFSI  PP₁₃FSI

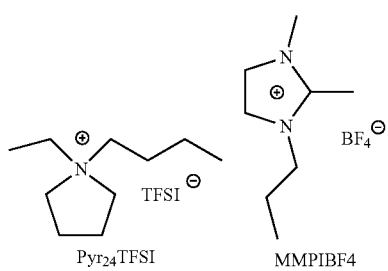

Pyr₂₄TFSI  MMPIBF4

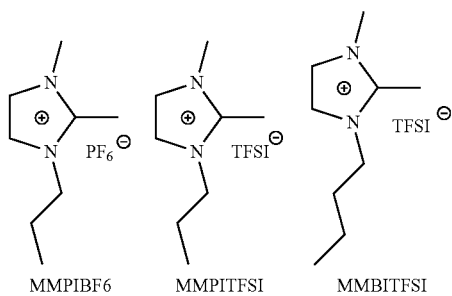

MMPIBF6  MMPITFSI  MMBITFSI

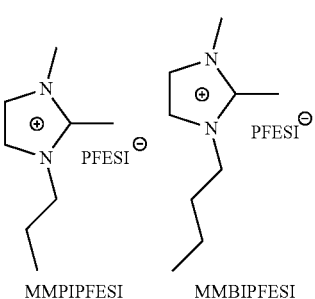

MMPIPFESI  MMBIPFESI

The cross-linking group (CL) includes but is not limited to the following structure:

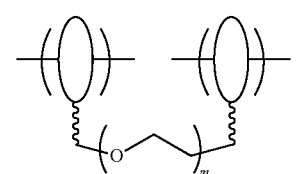

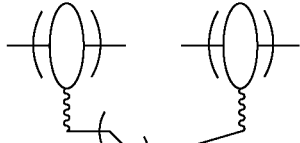

m = 1-100

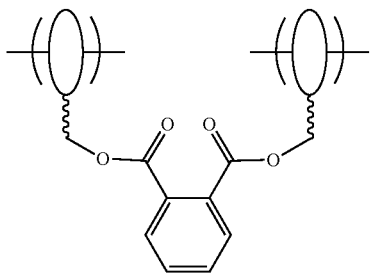

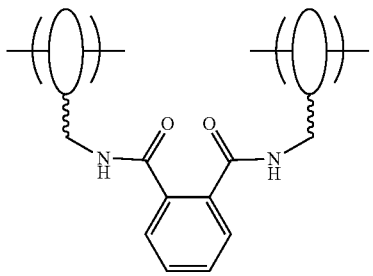

The main chain of brush block copolymer includes but is not limited to the following structure:

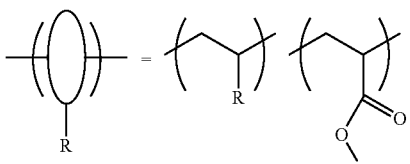

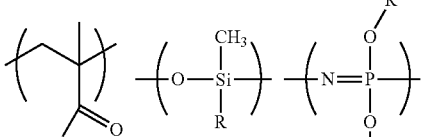

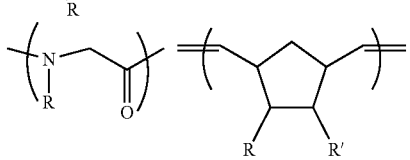

The ion-conducting group (IC) includes but is not limited to the following structure:

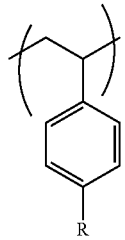

3 < n < 2000   3 < n < 2000
PEG          PEGDME

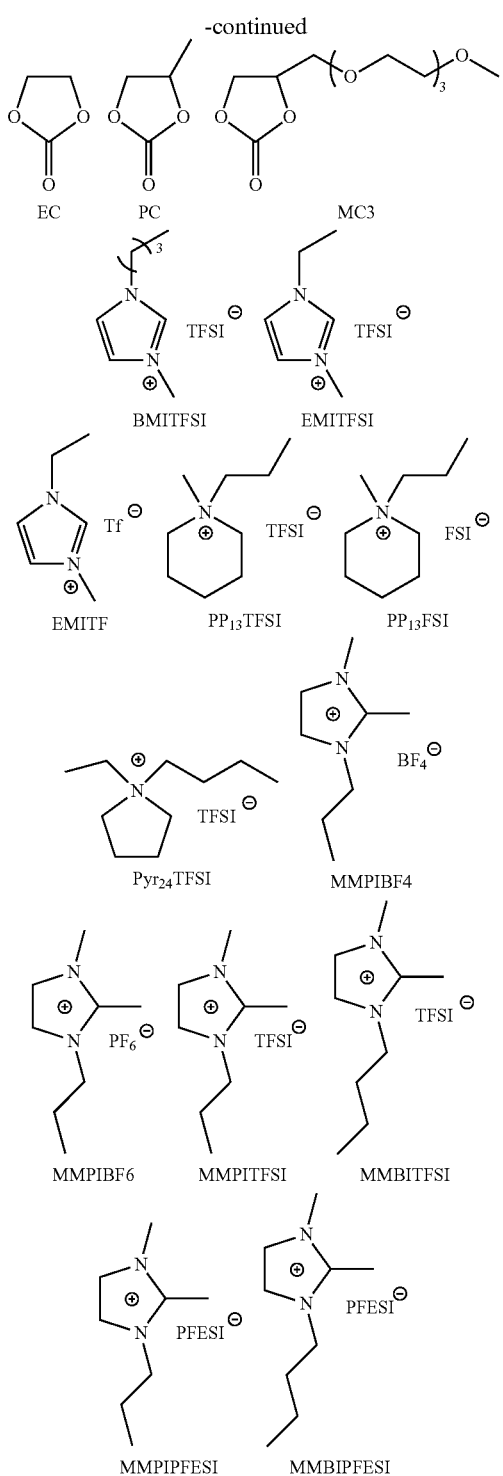

In an embodiment of the present application, a thickness of the ion transfer layer is selected from 0.1 μm to 200 μm; for example, it may be 0.1 μm, 0.2 μm, 0.5 μm, 0.8 μm, 1 μm, 2 μm, 5 μm, 8 μm, 10 μm, 20 μm, 30 μm, 40 μm, 50 μm, 60 μm, 70 μm, 80 μm, 90 μm, 100 μm, 110 μm, 120 μm, 130 μm, 150 μm, 160 μm, 180 μm, or 200 μm etc. The ion transfer layer is a transfer channel of ions.

In an embodiment of the present application, the electrochromic layer is selected from one or a combination of at least two of electrochromic metal oxide such as tungsten oxide, poly(decylviologen) and its derivative, polyaniline and its derivative, polypyrrole and its derivative, polythiophene and its derivative, poly(3,4-ethylenedioxythiophene) and its derivative, polythieno[3,4-b][1,4]dioxepane and its derivative, polyfuran and its derivative, polyfluorene and its derivative, polycarbazole and its derivative, and/or, a copolymer formed from a monomer or an oligomer of the above polymers and an electron deficient monomer.

In an embodiment of the present application, the electron deficient monomer includes but is not limited to one or a combination of at least two of benzothiadiazole, benzoselenadiazole, benzoxazole, benzotriazole, benzimidazole, quinoxaline and diketopyrrolopyrrole.

The color-transition of the electrochromic layer may be adjusted by the type of electrochromic materials; for example, it may be a transition between black and transparent, a transition between black and red, a transition between black and yellow, etc.

In an embodiment of the present application, a thickness of the electrochromic layer is selected from 1 nm to 10000 nm; for example, it may be 1 nm, 3 nm, 5 nm, 10 nm, 20 nm, 50 nm, 80 nm, 100 nm, 200 nm, 300 nm, 400 nm, 500 nm, 600 nm, 800 nm, 1000 nm, 2000 nm, 5000 nm, 8000 nm, or 10000 nm, etc.

In an embodiment of the present application, a material of the first transparent substrate and a material of the second transparent substrate may each independently be glass or flexible substrate material.

The flexible substrate material includes but is not limited to PET, cyclic olefin copolymer, cellulose triacetate, etc.

In an embodiment of the present application, a total thickness of the electrochromic aperture is less than or equal to 1 mm.

The total thickness of the electrochromic aperture provided in the present application can be controlled less than or equal to 5 mm, and a low thickness (or Z-axis height) is beneficial to the zoom and regulation of the camera.

In a tenth aspect, the present application provides an aperture-lens combination, including:

a combination of concave lens and convex lens for achromatism, and the electrochromic aperture according to the seventh aspect attached to the surface of the concave lens or convex lens;

or the aperture-lens combination includes:

a combination of concave lens and convex lens for achromatism, wherein the concave lens is the electrochromic aperture according to the eighth aspect.

In an eleventh aspect, the present application provides a lens module, including:

an achromatic lens combination, the electrochromic aperture according to the second, third, fourth, fifth, seventh, eighth or ninth aspect of the present application, an exposure controller, an image sensor, a pulse voltage controller, a light intensity sensor, a photosensitive element, a circuit board and a chip;

wherein, the centers of the achromatic lens combination, the electrochromic aperture, the exposure controller and the image sensor are on the same optical axis;

or, including:

the aperture-lens combination according to the tenth aspect, an exposure controller, an image sensor, a pulse voltage controller, a light intensity sensor, a photosensitive element, a circuit board and a chip;

wherein, the centers of the aperture-lens combination, the electrochromic aperture, the exposure controller and the image sensor are on the same optical axis.

In a specific embodiment, the achromatic lens combination includes a front lens and a rear lens, in which the front lens and rear lens each independently include one or more lenses. In an example, a material of the lens is one or more resins that can be processed by ultraviolet curing, thermal curing or normal-temperature curing, such as polycarbonate, polyester or polyurethane. The combination of the front lens and rear lens is mainly used for achromatism.

The electrochromic aperture is mainly used to adjust the opening size of the diaphragm for light to pass and then adjust the amount of light through the lens module.

The pulse voltage controller is mainly used to act on the electrochromic aperture by applying a pulse voltage, thereby changing the light transmittance of the electrochromic aperture. The pulse voltage controller is affected by the light intensity sensor, exposure controller, lens movement button, etc.

According to environmental parameters, the image sensor controls the pulse voltage controller for adjusting the diaphragm of the electrochromic aperture, and controls the exposure controller to control the exposure parameters and exposure time. Environmental parameters include factors such as pixel integration time, ambient illuminance, flash and whether flash is available. The image sensor may be any conventional solid state imaging sensor that is capable of capturing a focused optical image, such as a complementary metal oxide semiconductor (CMOS) sensor chip.

The photosensitive element can convert the light into electric charge, and convert the analog signal into the digital signal through an analog-to-digital converter chip. After compression, the digital signal is saved by the flash memory or internal hard disk (including charge coupled device (CCD), complementary metal oxide semiconductor (CMOS)).

In the present application, the entire preparation process of the lens module for adjusting the amount of light getting through and the shooting effect can be summed in the steps described below:

(1) preparing the electrochromic aperture;

(2) molding and curing of the achromatic lens combination, and forming the electrochromic aperture lens combining the electrochromic aperture;

(3) installing and commissioning the image sensor, pulse voltage controller and photosensitive element:

through precisely commissioning, the electrochromic aperture, the achromatic lens combination and the image sensor are arranged to locate on the same optical axis; the image sensor detects the ambient illuminance, converts it into the electrical signal and outputs the signal for the control chip, and then regulates the pulse voltage controller to output corresponding current for changing the light transmittance of electrochromic aperture; meanwhile, the voice coil motor changes to the corresponding focal length to achieve optimal shooting parameters; then the exposure controller controls the exposure; the image signal is converted into an electrical signal by CCD and then outputted as an image after processing; and (4) combining the electrochromic aperture lens with other components to form the lens module:

the electrochromic aperture lens and other components, such as exposure controller, CCD and voice coil motor, are installed together after precisely commissioning, so as to give the lens module.

Compared with the prior art, the present application has the beneficial effects described below.

The preparation method of the electrochromic aperture provided in the first aspect of the present application ensures that the aperture can achieve the multi-level control while effectively avoiding the problem such as uneven color-transition caused by traditional etching method.

The electrochromic aperture provided in the third and fourth aspects of the present application achieves the aperture multi-level control while avoiding the problem of light leakage or opacity caused by etching recesses.

The electrochromic aperture provided in the fifth aspect of the present application and the method of multi-level control for electrochromic aperture provided in the sixth aspect of the present application achieve the aperture multi-level control while avoiding the problem of light leakage or opacity caused by etching recesses.

The electrochromic aperture provided in the seventh aspect of the present application has a cambered structure, has an identical curvature to the curvature of the surface of the concave lens or convex lens in the achromatic lens combination, and can be attached to the surface of the concave lens or convex lens in the achromatic lens combination, so as to achieve the combination of the aperture and lens in the lens module and further reduce the thickness of the lens module.

The electrochromic aperture provided in the eighth aspect of the present application has a cambered surface structure, and has an identical shape to the shape of the concave lens or convex lens in the achromatic lens combination, and can replace the concave lens or convex lens in the achromatic lens combination, so as to achieve the combination of the aperture and lens in the lens module and further reduce the thickness of the lens module.

The electrochromic aperture provided in the ninth aspect of the present application has different color-transition ranges from inside to outside, and can achieve the adjustment of aperture luminous flux level number in a greater difference and satisfy the requirements of diverse shooting scenes.

wherein 11 is the first transparent substrate, 12 is the first transparent conductive layer, 13 is the ion storage layer, 14 is the ion transfer layer, 15 is the electrochromic layer, 16 is the second transparent conductive layer, and 17 is the second transparent substrate.

Figure 2:
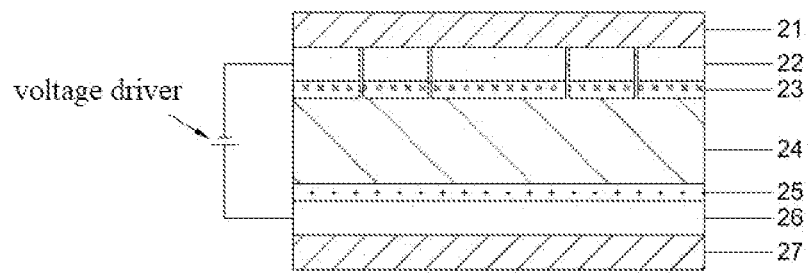

FIG. 2 is a schematic cross-sectional view of the electrochromic aperture provided by Example 1-2 of the present application;

wherein 21 is the first transparent substrate, 22 is the first transparent conductive layer, 23 is the ion storage layer, 24 is the ion transfer layer, 25 is the electrochromic layer, 26 is the second transparent conductive layer, and 27 is the second transparent substrate.

Figure 3:
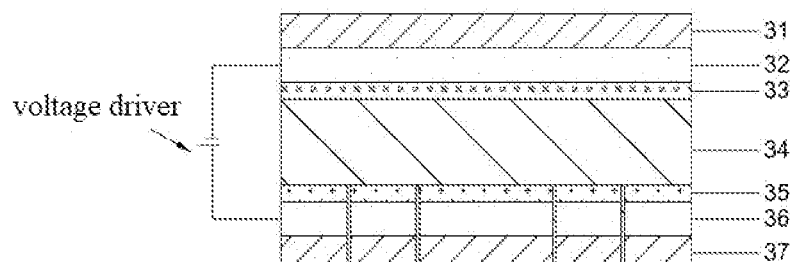

FIG. 3 is a schematic cross-sectional view of the electrochromic aperture provided by Example 1-3 of the present application;

wherein 31 is the first transparent substrate, 32 is the first transparent conductive layer, 33 is the ion storage layer, 34 is the ion transfer layer, 35 is the electrochromic layer, 36 is the second transparent conductive layer, and 37 is the second transparent substrate.

Figure 4:
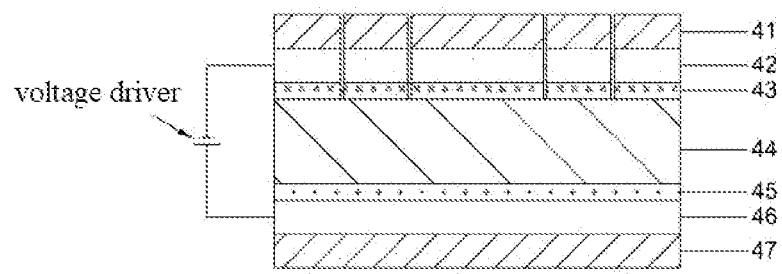

FIG. 4 is a schematic cross-sectional view of the electrochromic aperture provided by Example 1-4 of the present application;

wherein 41 is the first transparent substrate, 42 is the first transparent conductive layer, 43 is the ion storage layer, 44 is the ion transfer layer, 45 is the electrochromic layer, 46 is the second transparent conductive layer, and 47 is the second transparent substrate.

Figure 5:
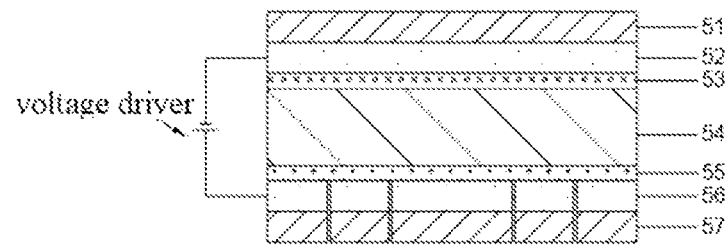

FIG. 5 is a schematic cross-sectional view of the electrochromic aperture provided by Example 1-5 of the present application;

wherein 51 is the first transparent substrate, 52 is the first transparent conductive layer, 53 is the ion storage layer, 54 is the ion transfer layer, 55 is the electrochromic layer, 56 is the second transparent conductive layer, and 57 is the second transparent substrate.

Figure 6:
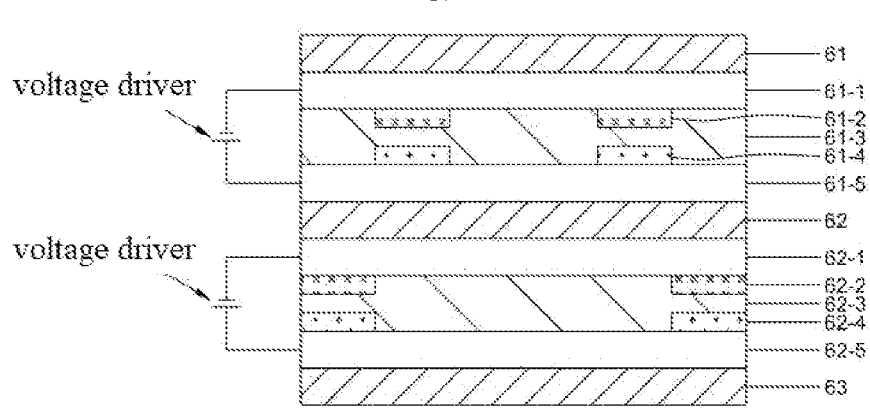

FIG. 6 is a schematic cross-sectional view of the electrochromic aperture provided in Example 2 of the present application;

wherein 61, 62 and 63 are the transparent substrate; 61-1, 61-5, 62-1 and 62-5 are the transparent conductive layer; 61-2 and 62-2 are the ion storage layer; 61-3 and 62-3 are the ion transfer layer; and 61-4 and 62-4 are the electrochromic layer.

Figure 7:
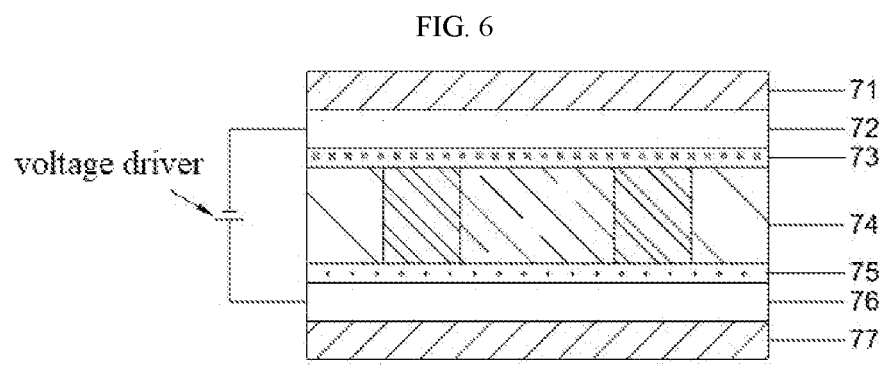

FIG. 7 is a schematic cross-sectional view of the electrochromic aperture provided by Example 3-1 of the present application;

wherein 71 is the first transparent substrate, 72 is the first transparent conductive layer, 73 is the ion storage layer, 74 is the ion transfer layer, 75 is the electrochromic layer, 76 is the second transparent conductive layer, and 77 is the second transparent substrate.

Figure 8:
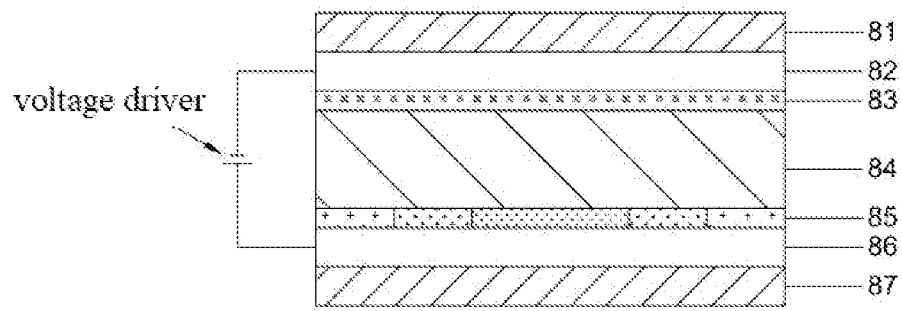

FIG. 8 is a schematic cross-sectional view of the electrochromic aperture provided by Example 3-2 of the present application;

wherein 81 is the first transparent substrate, 82 is the first transparent conductive layer, 83 is the ion storage layer, 84 is the ion transfer layer, 85 is the electrochromic layer, 86 is the second transparent conductive layer, and 87 is the second transparent substrate.

Figure 9:
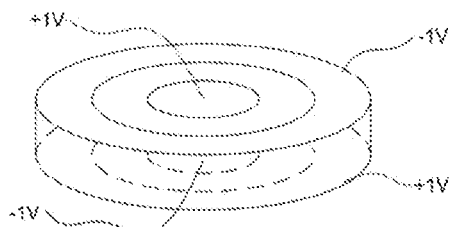

FIG. 9 is a schematic diagram of the method performing multi-level control on the electrochromic aperture in Example 4 of the present application.

Figure 10:
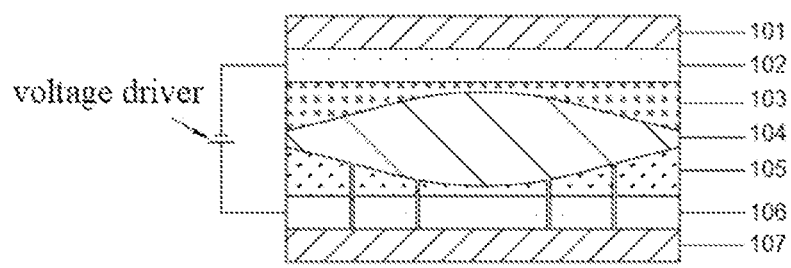

FIG. 10 is a schematic cross-sectional view of the electrochromic aperture provided in Example 5-1 of the application;

wherein 101 is the first transparent substrate, 102 is the first transparent conductive layer, 103 is the ion storage layer, 104 is the ion transfer layer, 105 is the electrochromic layer, 106 is the second transparent conductive layer, and 107 is the second transparent substrate.

Figure 11:
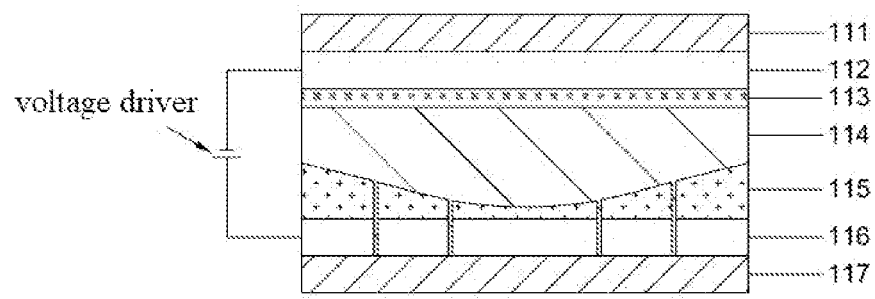

FIG. 11 is a schematic cross-sectional view of the electrochromic aperture provided in Example 5-2 of the present application;

wherein 111 is the first transparent substrate, 112 is the first transparent conductive layer, 113 is the ion storage layer, 114 is the ion transfer layer, 115 is the electrochromic layer, 116 is the second transparent conductive layer, and 117 is the second transparent substrate.

Figure 12:
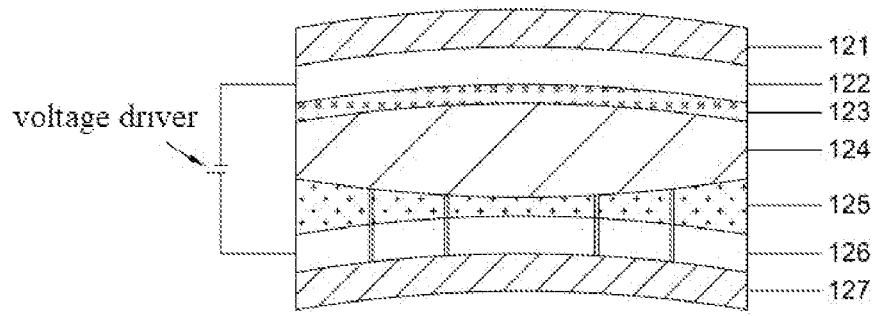

FIG. 12 is a schematic cross-sectional view of the cambered electrochromic aperture provided in Example 6-1 of the present application;

wherein 121 is the first transparent substrate, 122 is the first transparent conductive layer, 123 is the ion storage layer, 124 is the ion transfer layer, 125 is the electrochromic layer, 126 is the second transparent conductive layer, 127 is the second transparent substrate.

Figure 13:
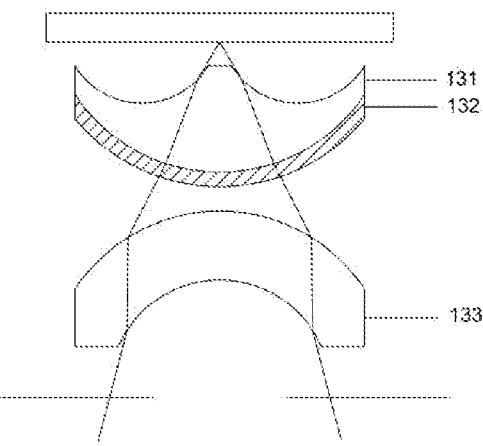

FIG. 13 is a schematic structural diagram of the aperture-lens combination provided in Example 6-1 of the present application;

wherein 131 is the convex lens, 132 is the cambered electrochromic aperture provided in Example 6-1, and 133 is the concave lens.

Figure 14:
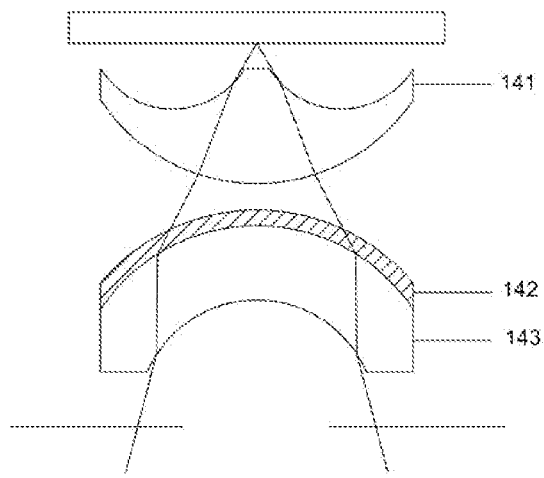

FIG. 14 is a schematic structural diagram of the aperture-lens combination provided in Example 6-2 of the present application;

wherein 141 is the convex lens, 142 is the cambered electrochromic aperture provided in Example 6-2, and 143 is the concave lens.

Figure 15:
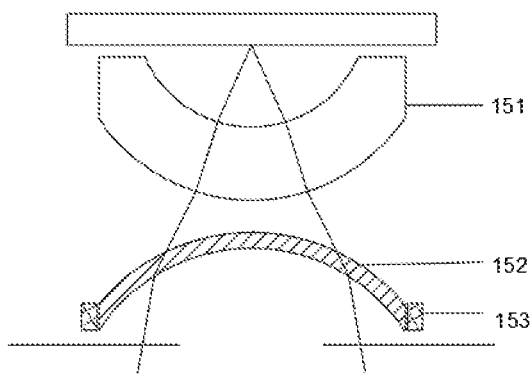

FIG. 15 is a schematic structural diagram of the aperture-lens combination provided in Example 6-3 of the present application;

wherein 151 is the convex lens, 152 is the cambered electrochromic aperture provided in Example 6-3, and 153 is the holder.

Figure 16:
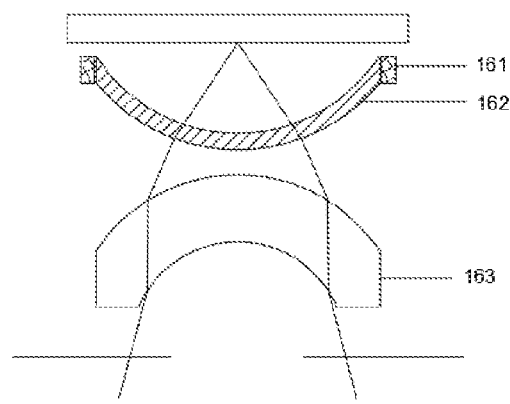

FIG. 16 is a schematic structural diagram of the aperture-lens combination provided in Example 6-4 of the present application;

wherein 161 is the holder, 162 is the cambered electrochromic aperture provided in Example 6-4, and 163 is the concave lens.

DETAILED DESCRIPTION

The technical solution of the present application is further described below with reference to the accompanying drawings and through specific embodiments. It should be apparent to those skilled in the art that the specific embodiments described herein are only used for a better understanding of the present application, and should not be construed as a specific limitation of the present application.

In an embodiment of the present application, the preparation method of Polymer A (a class of solid electrolyte polymer belonging to PEGPRCL) is described below.

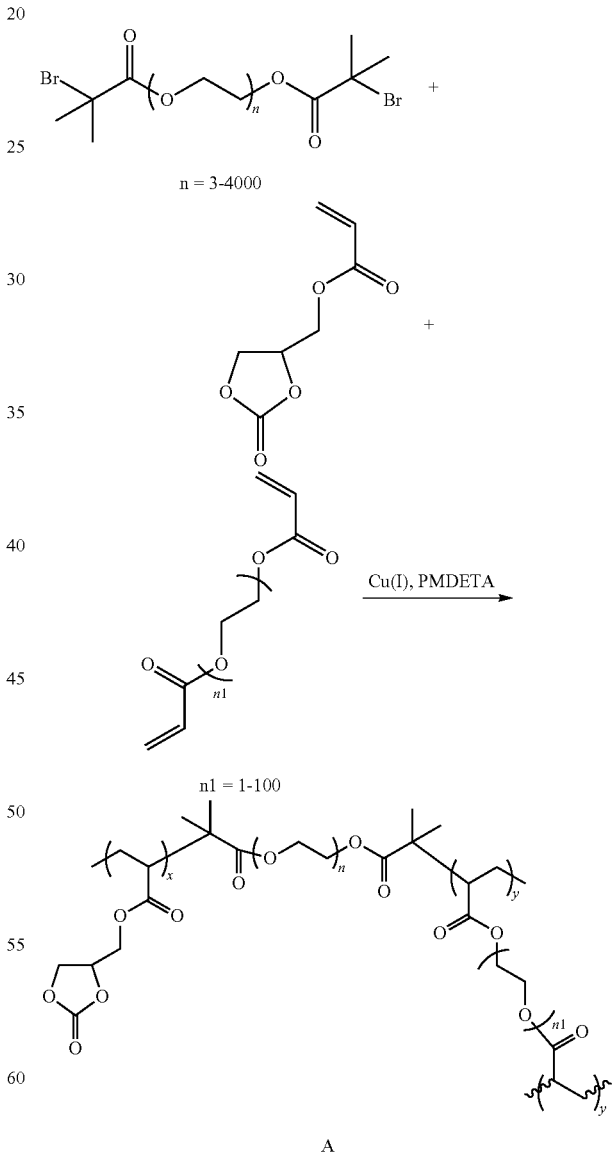

A

Bromoisobutyric acid-terminated PEG (polyethylene glycol), acrylate with plasticized groups, the cross-linking group with two acrylic acid, the monovalent copper catalyst and the PMDETA (N,N,N',N'',N''-pentamethyldiethylenetriamine) ligand were added in a suitable organic solvent. The mixed solution (the mixture without adding solvent can also be used as an electrolyte precursor directly for device preparation) was reacted at 100° C. for 12 hours, filtered through celite and rid the solvent off under reduced pressure so as to obtain polymer A.

The preparation method of Polymer B (a class of solid electrolyte polymer belonging to PEGPR) is described below.

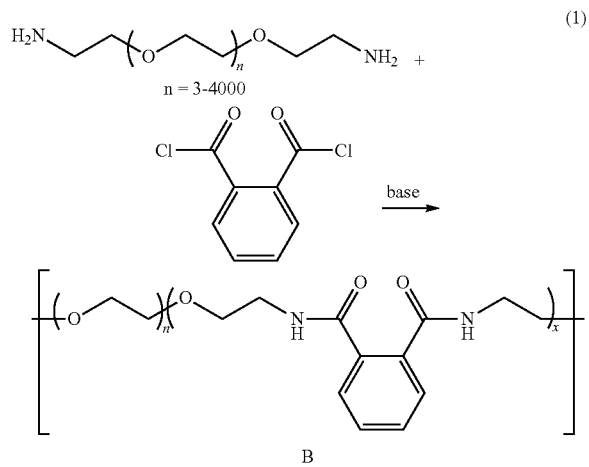

B

PEG diamine (poly(ethylene glycol)diamine) and phthaloyl chloride were added in a suitable organic solvent, and directly polymerized under an alkaline condition so as to obtain a polymer electrolyte (the mixture without adding solvent can also be used as an electrolyte precursor directly for device preparation). After water-washing, liquid separation, drying, and solvent-removal, Polymer B was obtained.

The preparation method of Polymer C (a class of solid electrolyte polymer belonging to PEGSPCL) was described below.

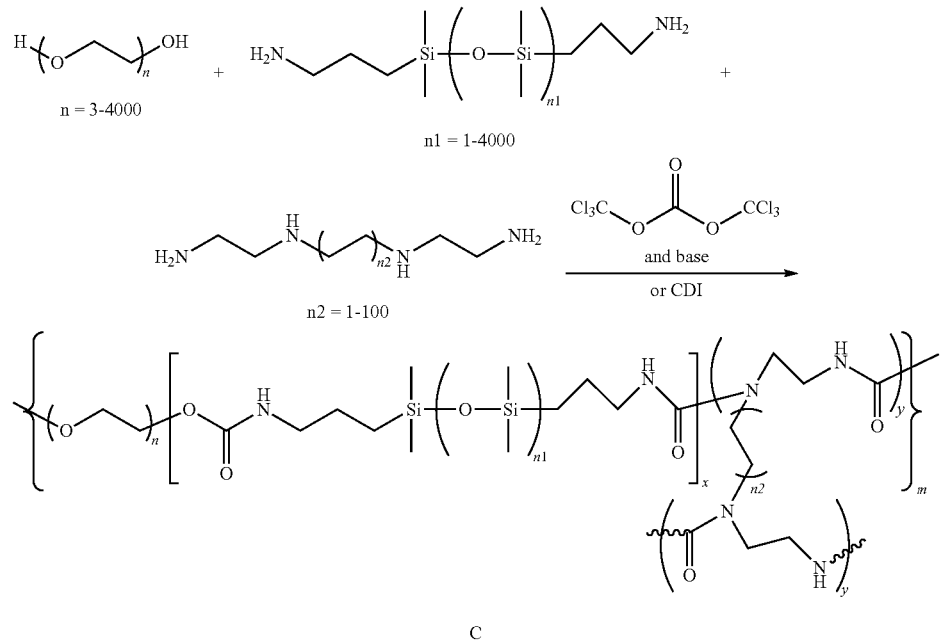

C

PEG (polyethylene glycol), polysiloxane diamine, the crosslinking agent tetraamine and the condensing agent CDI (carbonyldiimidazole) were added in a suitable organic solvent (the mixture without adding solvent can also be used as an electrolyte precursor directly for device preparation). The mixed solution was reacted at 90° C. to obtain the polymer. After water-washing, liquid separation, drying, and solvent-removal, Polymer C was obtained.

The preparation method of Polymer D (a class of solid electrolyte polymer belonging to PEGSP) was described below.

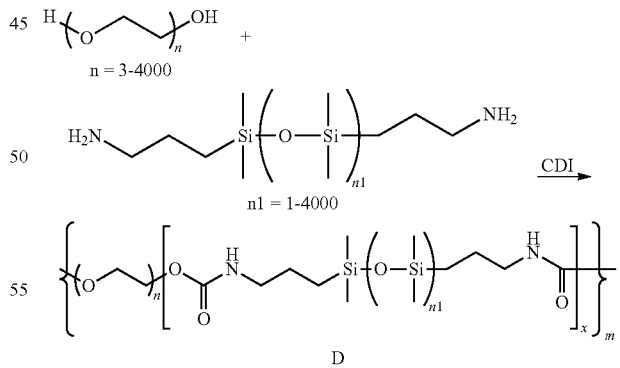

D

PEG (polyethylene glycol), polysiloxane diamine and the condensing agent CDI (carbonyldiimidazole) were added in a suitable organic solvent (the mixture without adding solvent can also be used as an electrolyte precursor directly for device preparation). The mixed solution was reacted at 120° C. to obtain the polymer, and after water-washing, liquid separation, drying, and solvent-removal, Polymer D was obtained.

The preparation method of Polymer E (a class of solid electrolyte polymer belonging to PEGSP-PRCL) was described below.

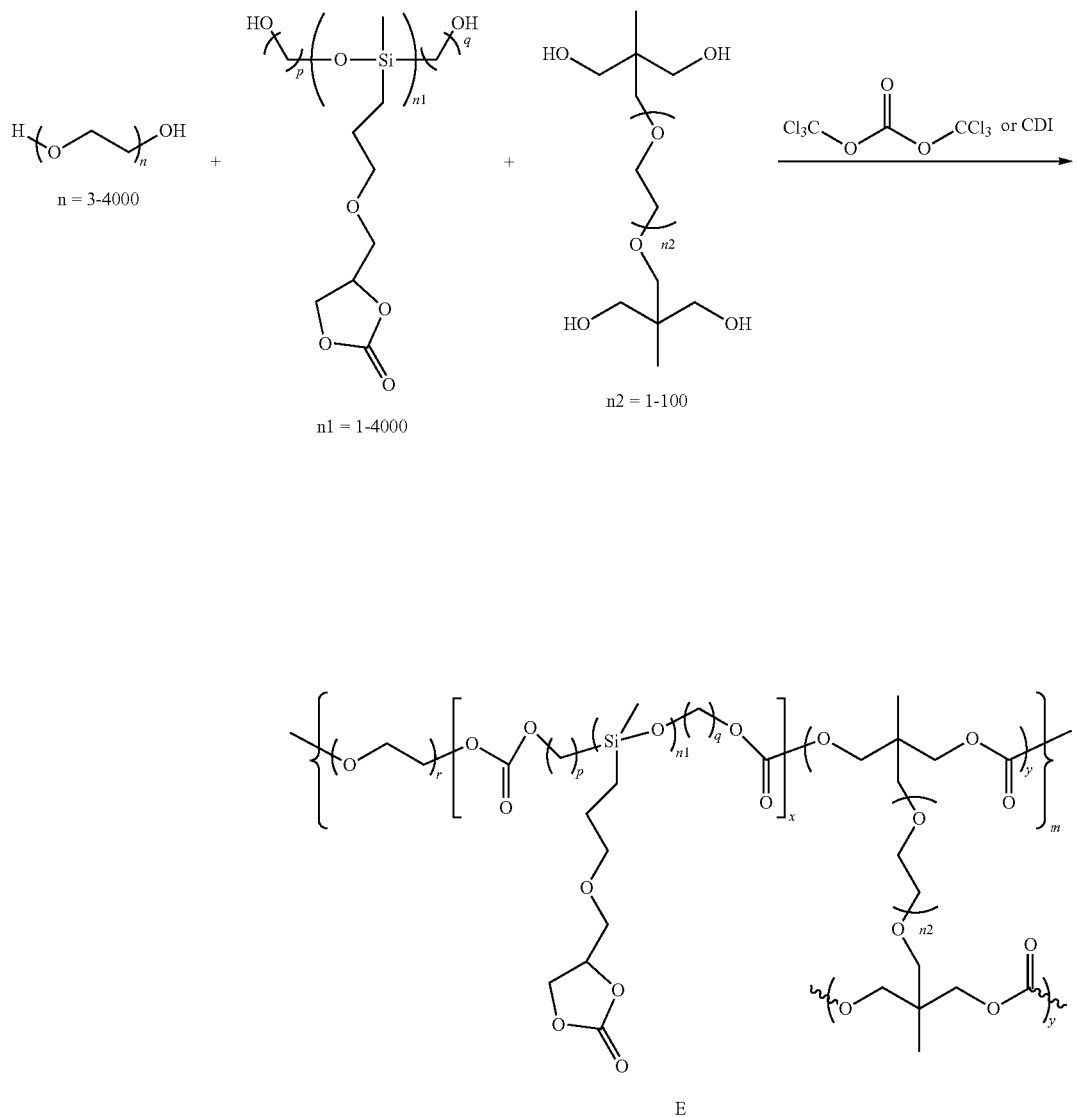

E

PEG (polyethylene glycol), polysiloxanediol, the cross-linking agent tetraol and the condensing agent CDI (carbonyldiimidazole) were added in a suitable organic solvent (the mixture without adding solvent can also be used as an electrolyte precursor directly for device preparation) The mixed solution was reacted at 100° C. to obtain the polymer. After water-washing, liquid separation, drying, and solvent-removal, Polymer E was obtained.

The preparation method of Polymer F (a class of solid electrolyte polymer belonging to PEGSP-PR) was described below.

-continued

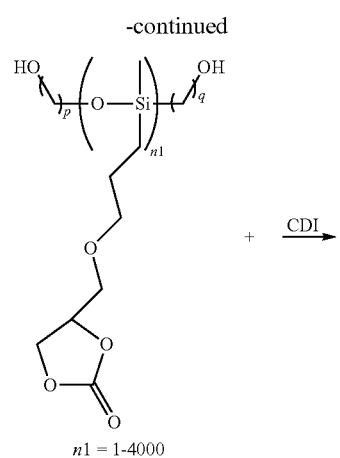

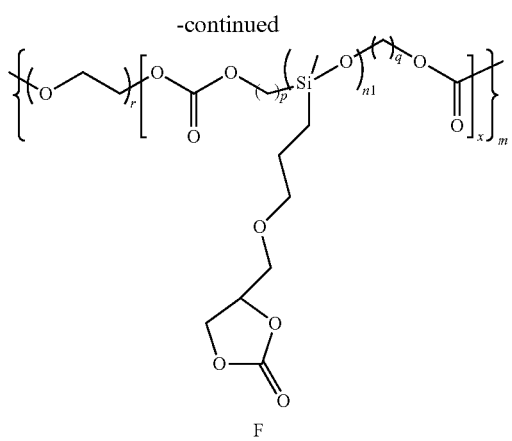

F

PEG (polyethylene glycol), polysiloxanediol, and the condensing agent CDI (carbonyldiimidazole) were added in a suitable organic solvent (the mixture without adding solvent can also be used as an electrolyte precursor directly for device preparation). The mixed solution was reacted at 100° C. to obtain the polymer. After water-washing, liquid separation, drying, and solvent-removal, Polymer F was obtained.

The preparation method of Polymer G (a class of solid electrolyte polymer belonging to ICNMCL) was described below.

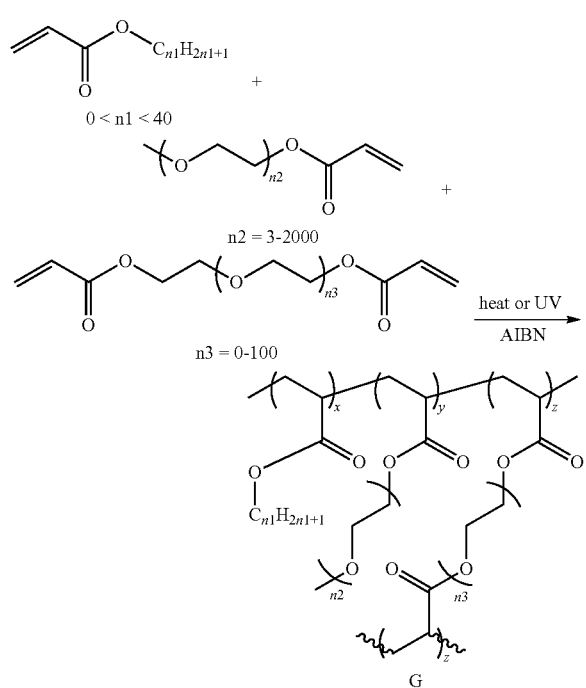

G

Alkyl acrylate, polyethylene glycol acrylate, ethylene glycol diacrylate and AIBN (azobisisobutylcyanide) were added in a suitable organic solvent (the mixture without adding solvent can also be used as an electrolyte precursor directly for device preparation). The polymer was obtained by photoreaction. After water-washing, liquid separation, drying, and solvent-removal, Polymer G was obtained.

The preparation method of Polymer H (a class of solid electrolyte polymer belonging to ICNM) was described below.

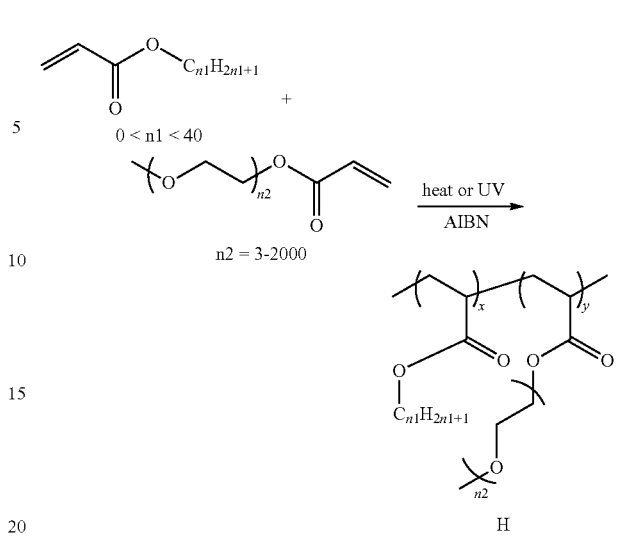

H

Alkyl acrylate, polyethylene glycol acrylate and AIBN (azobisisobutylcyanide) were added in a suitable organic solvent (the mixture without adding solvent can also be used as an electrolyte precursor directly for device preparation). The polymer was obtained by photoreaction. After water-washing, liquid separation, drying, and solvent-removal, Polymer H was obtained.

Example 1-1

This example provides an electrochromic aperture that achieves multi-level control through partition and a preparation method thereof.

Figure 1:
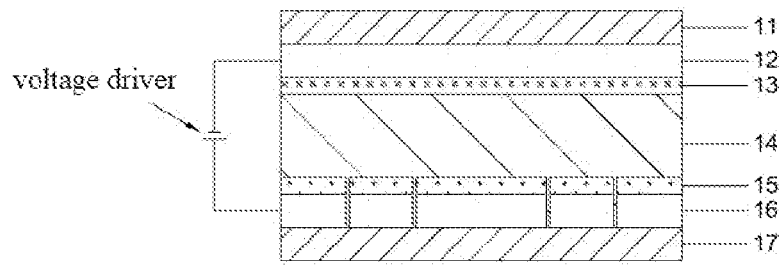
FIG. 1 is a schematic cross-sectional view of the electrochromic aperture provided by Example 1-1 of the present application.

The structure of the electrochromic aperture is shown in FIG. 1, including a first transparent substrate 11, a first transparent conductive layer 12, an ion storage layer 13, an ion transfer layer 14, an electrochromic layer 15, a second transparent conductive layer 16 and a second transparent substrate 17 stacked in sequence;

wherein, the electrochromic layer 15 and the second transparent conductive layer 16 were etched with a plurality of annular recesses centering on the central axis of the electrochromic aperture.

The preparation method of electrochromic aperture in this example is described below.

(1) Preparation of the Electrochromic Layer 15

500 mg of poly(3-hexylthiophene) (P3HT) was dissolved in 10 mL of o-xylene; after stirring magnetically for 10 h, the obtained solution was dropped onto an ITO layer (the second transparent conductive layer 16) deposited on a glass substrate (the second transparent substrate 17), and dispensed by spin coating to form a P3HT coating; according to the structure shown in FIG. 1, a plurality of annular recesses were etched by laser into the P3HT coating and the second transparent conductive layer so as to the obtain electrochromic layer 15.

(2) Preparation of the Ion Storage Layer 13

500 mg of tungsten trioxide was dissolved in 20 mL of deionized water; after stirring and filtration, the obtained solution was dropped onto an ITO layer (the first transparent conductive layer 12) deposited on a glass substrate (the first transparent substrate 11), and dispensed by spin coating to form a tungsten trioxide coating so as to obtain the ion storage layer 13.

(3) Preparation of the Electrochromic Aperture 10 wt % of lithium perchlorate, 89.9 wt % of the Polymer H precursor and 0.1 wt % of azobisisobutyronitrile were mixed, and coated on the ion storage layer 13 described above to form an electrolyte coating; then the electrochromic layer 15 described above (together with the ITO layer and the glass substrate) was covered on the electrolyte coating; by ultraviolet curing, the electrolyte coating formed an all-solid polymer electrolyte layer (the ion transfer layer 14) so as to obtain the electrochromic aperture.

Example 1-2

This example provides an electrochromic aperture that achieves multi-level control through partition and a preparation method thereof.

The structure of the electrochromic aperture is shown in FIG. 2, including a first transparent substrate 21, a first transparent conductive layer 22, an ion storage layer 23, an ion transfer layer 24, an electrochromic layer 25, a second transparent conductive layer 26 and a second transparent substrate 27 stacked in sequence;

wherein, the ion storage layer 23 and the first transparent conductive layer 22 were simultaneously etched with a plurality of annular recesses centering on the central axis of the electrochromic aperture.

The preparation method of the electrochromic aperture in this example differs from Example 1-1 in that after the ion storage layer 23 was coated, the ion storage layer 23 and the first transparent conductive layer 22 were subjected to laser etching.

Example 1-3

This example provides an electrochromic aperture that achieves multi-level control through partition and a preparation method thereof.

The structure of the electrochromic aperture is shown in FIG. 3, including a first transparent substrate 31, a first transparent conductive layer 32, an ion storage layer 33, an ion transfer layer 34, an electrochromic layer 35, a second transparent conductive layer 36 and a second transparent substrate 37 stacked in sequence;

wherein, the second transparent substrate 37, the second transparent conductive layer 36 and the electrochromic layer 35 were etched with a plurality of annular recesses centering on the central axis of the electrochromic aperture.

The preparation method of the electrochromic aperture in this example differs from Example 1-1 in that the laser etching operation was started after the ultraviolet curing of the ion transfer layer in step (3) was completed; the etching was performed on the side of the second transparent substrate 37; the three layers, including the second transparent substrate 37, the second transparent conductive layer 36 and the electrochromic layer 35, were simultaneously etched with annular recesses.

Example 1-4

This example provides an electrochromic aperture that achieves multi-level control through partition and a preparation method thereof.

The structure of the electrochromic aperture is shown in FIG. 4, including a first transparent substrate 41, a first transparent conductive layer 42, an ion storage layer 43, an ion transfer layer 44, an electrochromic layer 45, a second transparent conductive layer 46 and a second transparent substrate 47 stacked in sequence;

wherein, the first transparent substrate 41, the first transparent conductive layer 42 and the ion storage layer 43 were etched with a plurality of annular recesses centering on the central axis of the electrochromic aperture.

The preparation method of the electrochromic aperture in this example differs form Example 1-1 in that the laser etching operation was started after the ultraviolet curing of the ion transfer layer in step (3) was completed; the etching was performed on the side of the first transparent substrate 41; the three layers, including the first transparent substrate 41, the first transparent conductive layer 42 and the ion storage layer 43, were simultaneously etched with annular recesses.

Example 1-5

This example provides an electrochromic aperture that achieves multi-level control through partition and a preparation method thereof.

The structure of the electrochromic aperture is shown in FIG. 5, including a first transparent substrate 51, a first transparent conductive layer 52, an ion storage layer 53, an ion transfer layer 54, an electrochromic layer 55, a second transparent conductive layer 56 and a second transparent substrate 57 stacked in sequence;

wherein, the second transparent substrate 57 and the second transparent conductive layer 56 were etched with a plurality of annular recesses centering on the central axis of the electrochromic aperture.

The preparation method of the electrochromic aperture in this example differs from Example 1-1 in that the laser etching operation was started after the ultraviolet curing of the ion transfer layer in step (3) was completed; the etching was performed on the side of the second transparent substrate 57; the two layers, including the second transparent substrate 57 and the second transparent conductive layer 56, were simultaneously etched with annular recesses.

For the preparation methods adopted in Examples 1-1 to 1-5, since the etching operation was performed after the ion storage layer and the electrochromic layer had been coated, the problem caused by the traditional etching method, such as uneven color-transition, could be effectively avoided, while it was ensured that the aperture was capable of achieving multi-level control.

Example 2

This example provides an electrochromic aperture that achieves multi-level control by stacking a plurality of electrochromic units. As shown in FIG. 6, the electrochromic aperture is fabricated by stacking two independent electrochromic units, including a transparent substrate 61, a transparent conductive layer 61-1, an ion storage layer 61-2, an ion transfer layer 61-3, an electrochromic layer 61-4, a transparent conductive layer 61-5, a transparent substrate 62, a transparent conductive layer 62-1, an ion storage layer 62-2, an ion transfer layer 62-3, an electrochromic layer 62-4, a transparent conductive layer 62-5 and a transparent substrate 63 stacked in sequence;

wherein, the geometry of the ion storage layer 61-2 and 62-2 and the electrochromic layer 61-4 and 62-4 was an annulus centering on the central axis of the electrochromic aperture; the ion storage layer 61-2 and the electrochromic layer 61-4 had the same shape and were aligned to each other; the ion storage layer 62-2 and the electrochromic layer 62-4 had the same shape and were aligned to each other; and the outer diameter of the electrochromic layer 61-4 was identical with the inner diameter of the electrochromic layer 62-4.

In this example, since the projections of the electrochromic layer 61-4 and the electrochromic layer 62-4 on the central axis of the electrochromic aperture were seamlessly connected, the problem of light leakage or opacity caused by etching recesses was avoided, while the multi-level control of the aperture was achieved.

In this example, there are two preparation methods for the annular electrochromic layer and the annular ion storage layer: first, the transparent conductive layer was covered above with a mask substrate of annular shape hollowed out, coated with the electrochromic layer or the ion storage layer on the top, and then got rid of the mask substrate so as to obtain the annular electrochromic layer or the annular ion storage layer; second, on the top of the transparent conductive layer that had been coated with electrochromic layer or ion storage layer, the annular electrochromic layer and the annular ion storage layer was obtained by laser etching, chemical etching or physical scrubbing.

The stacking method for various layers: firstly, the three transparent substrates were coated with the corresponding transparent conductive layers; then the annular electrochromic layer and the annular ion storage layer, covering on the transparent conductive layer, were prepared, which; then the ion transfer layer material was coated, and subjected to ultraviolet curing after combination. In the method, the materials of various layers were the same as those in Example 1.

Example 3-1

This example provides an electrochromic aperture that achieves multi-level control by controlling the onset color-transition voltage. As shown in FIG. 7, the electrochromic aperture includes a first transparent substrate 71, a first transparent conductive layer 72, an ion storage layer 73, an ion transfer layer 74 with different cross-linking degrees, an electrochromic layer 75, a second transparent conductive layer 76 and a second transparent substrate 77 stacked in sequence;

wherein, the ion transfer layer 74 was divided into three circular or annular regions from inside to outside which centered on the central axis of the electrochromic aperture, and the cross-linking degree of the ion transfer layer 74 gradually increased from inside to outside.

The specific implementation method: before the ion transfer layer was subjected to ultraviolet curing, the different regions were masked using the materials with different ultraviolet transmittance, so that the ion transfer layer materials of different regions had various cross-linking degrees, so as to achieve the diverse onset bright-transition voltage or onset dark-transition voltage for the different layers, and the specific steps are described below.

(1) Preparation of the Electrochromic Layer 75

500 mg of poly(3-hexylthiophene) (P3HT) was dissolved in 10 mL of o-xylene; after stirring magnetically for 10 h, the obtained solution was dropped onto an ITO layer (the second transparent conductive layer 76) deposited on a glass substrate (the second transparent substrate 77), and dispensed by spin coating to form a P3HT coating so as to obtain the electrochromic layer.

(2) Preparation of the Ion Storage Layer 73

500 mg of tungsten trioxide was dissolved in 20 mL of deionized water; after stirring and filtration, the obtained solution was dropped onto an ITO layer (the first transparent conductive layer 72) deposited on a glass substrate (the first transparent substrate 71), and dispensed by spin coating to form a tungsten trioxide coating so as to obtain the ion storage layer 73.

(3) Preparation of the Electrochromic Aperture 10 wt % of lithium bistrifluoromethanesulfonimide, 89.9 wt % of the of the Polymer G precursor and 0.1 wt % of perazobisisobutyronitrile were mixed, and coated on the ion storage layer described above to form an electrolyte coating; then the electrochromic layer 75 described above (together with the ITO layer and the glass substrate) was covered on the electrolyte coating; from the outside of the transparent substrate, by using the PET film which had the identical shape with the outermost annulus of the ion transfer layer 74, the 10% ultraviolet transmittance and the surface coating, the outermost annulus of the ion transfer layer 74 was masked; using the PET film which had the identical shape with the middle annulus, the 50% ultraviolet transmittance and the surface coating, the middle annulus of the ion transfer layer 74 was masked; using the PET film which had the identical shape with the innermost annulus and the 90% ultraviolet transmittance, the innermost annulus of the ion transfer layer 74 was masked; after heat curing, the electrochromic aperture was obtained.

Since the cross-linking degree of the ion transfer layer material gradually increased from inside to outside, the onset bright-transition voltage gradually increased from inside to outside; thereby when applying a forward voltage, the inner circle of the aperture would become bright preceding the outer circle of the aperture. Since the various regions of the aperture were continuous from inside to outside, the problem of light leakage or opacity caused by etching recesses was avoided while realizing the multi-level control of the aperture.

Example 3-2

This example provides an electrochromic aperture that achieves multi-level control by controlling the onset color-transition voltage. As shown in FIG. 8, the electrochromic aperture includes a first transparent substrate 81, a first transparent conductive layer 82, an ion storage layer 83, an ion transfer layer 84, an electrochromic layer 85, a second transparent conductive layer 86 and a second transparent substrate 87 stacked in sequence;

wherein, the electrochromic layer 85 was divided into three circular or annular regions from inside to outside which centered on the central axis of the electrochromic aperture; various regions had different electrochromic materials, and from inside to outside, the onset bright-transition voltage of the electrochromic material gradually increased and the onset dark-transition voltage gradually decreased.

The specific implementation method: the transparent conductive layer was coated with electrochromic materials having different voltages for starting to bright or dark transition, such as $WO_3$, poly(decylviologen) and its derivative, polyaniline and its derivative, poly(3-hexylthiophene) and its derivative, poly(3,4-ethylenedioxythiophene) and its derivative, polythieno[3,4-b][1,4]dioxepane and its derivative, thus achieving that different layers had diverse onset bright-transition voltages or onset dark-transition voltages. The specific steps are described below.

(1) Preparation of the Electrochromic Layer 85

500 mg of poly(3,4-ethylenedioxythiophene) with alkyl side chain of ethylhexyl was dissolved in mL of chloroform, and magnetically stirred for 10 h, 500 mg of polythieno[3,4-b][1,4]dioxepane with alkyl side chain of ethylhexyl was dissolved in chlorobenzene, and stirred magnetically for 10 h; 500 mg of poly(3-hexylthiophene) (P3HT) was dissolved in 10 mL of o-xylene, and magnetically stirred for 10 h. By inkjet printing, the poly(3,4-ethylenedioxythiophene) solution was printed on an ITO layer (the second transparent conductive layer 86) deposited on a glass substrate (the second transparent substrate 87) to form a poly(3,4-ethylenedioxythiophene) coating in the innermost circle; by inkjet printing, the polythieno[3,4-b][1,4]dioxepane solution was printed on an ITO layer (the second transparent conductive layer 86) deposited on a glass substrate (the second transparent substrate 87), forming a polythieno[3,4-b][1,4]dioxepane coating in the second circle; by inkjet printing, the poly(3-hexylthiophene) solution was printed on an ITO layer (the second transparent conductive layer 86) deposited on a glass substrate (the second transparent substrate 87), forming a poly(3-hexylthiophene) coating in the outermost circle, so that the preparation of the electrochromic layer 85 was completed.

(2) Preparation of the Ion Storage Layer 83

500 mg of tungsten trioxide was dissolved in 20 mL of deionized water; after stirring and filtration, the obtained solution was dropped onto an ITO layer (the first transparent conductive layer 82) deposited on a glass substrate (the first transparent substrate 81), and dispensed by spin coating to form a tungsten trioxide coating so as to obtain the ion storage layer 83.

(3) Preparation of the Electrochromic Aperture 10 wt % of lithium perchlorate, 79.9 wt % of the Polymer G precursor and 0.1 wt % of perazobisisobutyronitrile were mixed and coated on the ion storage layer described above to form an electrolyte coating; then the electrochromic layer 85 (together with the ITO layer and the glass substrate) was covered on the electrolyte coating; after heat curing of 80° C., the electrochromic aperture was obtained.

For the three-layer materials of the electrochromic layer 85 described above, the onset bright-transition voltage gradually increased from inside to outside, yet the onset dark-transition voltage also gradually increased. When applying a forward voltage, the inner circle of the aperture would become bright preceding the outer circle of the aperture. Since the various regions of the aperture were continuous from inside to outside, the problem of light leakage or opacity caused by etching recesses was avoided while realizing the multi-level control of the aperture. During the dark-transition, the three-layer materials could return to the dark state at the same time by subjecting the two transparent conductive layers to short-circuit or by applying a negative voltage with an absolute value of less than 2V. Although there was no multi-level control for dark-transition, the requirements for aperture were still satisfied.

Example 4

This example provides an electrochromic aperture and a method of multi-level control for the electrochromic aperture.

In this example, the electrochromic aperture includes a first transparent substrate, a first transparent conductive layer, an ion storage layer, an ion transfer layer, an electrochromic layer, a second transparent conductive layer and a second transparent substrate stacked in sequence;

the electrochromic aperture had an identical material from inside to outside, and the electrochromic aperture had no recess.

The method of multi-level control: with the electrochromic aperture provided in this example, the center and the edge of the aperture were applied on different voltages respectively, and the voltage at the center was greater than the voltage at the edge, achieving multi-level control.

FIG. 9 is a schematic diagram of the method performing multi-level control on the electrochromic aperture in this example (the electrochromic layer was on the top, and the ion storage layer was on the bottom). As shown in FIG. 9, the voltage at the center is +2 V, and the voltage at the edge is −2 V. With the effect of such voltage, the voltage from the center to the edge was gradually distributed, forming a distribution in which the voltage gradually decreased from inside to outside. By changing the voltage at the center and the edge, it could be achieved to regulate the different transmittances of the aperture. Since the aperture was continuous from inside to outside, the problem of light leakage or opacity caused by etching recesses was avoided while realizing the multi-level control of the aperture.

Example 5-1

This example provides an electrochromic aperture that achieves multi-level control through an electrochromic layer with varying thickness, as shown in FIG. 10, including a first transparent substrate 101, a first transparent conductive layer 102, an ion storage layer 103, an ion transfer layer 104, an electrochromic layer 105, a second transparent conductive layer 106 and a second transparent substrate 107 stacked in sequence;

wherein, the second transparent conductive layer 106 was etched with a plurality of annular recesses centering on the central axis of the electrochromic aperture, and the thickness of the electrochromic layer 105 and the ion storage layer 103 gradually increased from inside to outside (the edge and the center had a thickness ratio of 1.1:1).

For the electrochromic aperture provided in this example, since the thickness of the electrochromic layer gradually increased from inside to outside, the aperture had different color-transition ranges from inside to outside. Compared with the aperture of which the electrochromic layer had a consistent thickness from inside to outside, the electrochromic aperture provided in this example could achieve adjusting aperture luminous flux level number in an extend range, satisfying the requirements of various shooting scenes.

Preparation Method this method differs from Example 1-1 in that after the electrochromic layer was coated, the electrochromic layer was firstly subjected to laser etching to make its thickness gradually increase from inside to outside, and then the second transparent conductive layer was etched with a plurality of annular recesses centering on the central axis of the electrochromic aperture; after the ion storage layer was coated, the ion storage layer was subjected to laser etching to make its thickness gradually increase from inside to outside (because the thickness of the ion transfer layer was in the order of a micrometer, while the thickness changes of the electrochromic layer and the ion storage layer were in the order of a nanometer, the actual thickness change of the ion transfer layer was negligible).

Example 5-2

This example provides an electrochromic aperture that achieves multi-level control through an electrochromic layer with varying thickness, as shown in FIG. 11, including a first transparent substrate 111, a first transparent conductive layer 112, an ion storage layer layer 113, an ion transfer layer 114, an electrochromic layer 115, a second transparent conductive layer 116 and a second transparent substrate 117 stacked in sequence;

wherein, the second transparent conductive layer 116 was etched with a plurality of annular recesses centering on the central axis of the electrochromic aperture, and the thickness of the electrochromic layer 115 gradually increased from inside to outside (the edges and the center had a thickness ratio of 1.1:1).

For the electrochromic aperture provided in this example, since the thickness of the electrochromic layer gradually increased from inside to outside, the aperture had different color-transition ranges from inside to outside. Compared with the aperture of which the electrochromic layer had a consistent thickness from inside to outside, the electrochromic aperture provided in this example could achieve adjusting aperture luminous flux level number in an extend range, satisfying the requirements of various shooting scenes.

Preparation Method this method differs from Example 1-1 in that after the electrochromic layer was coated, the electrochromic layer was firstly subjected to laser etching to make its thickness gradually increase from inside to outside, and then the second transparent conductive layer was etched with a plurality of annular recesses centering on the central axis of the electrochromic aperture (because the thickness of the ion transfer layer was in the order of a micrometer, while the thickness change of the electrochromic layer was in the order of a nanometer, the actual thickness change of the ion transfer layer was negligible).

Example 6-1

This example provides a combination of a cambered electrochromic aperture and an aperture-lens combination.

In this example, the structure of the cambered electrochromic aperture is shown in FIG. 12, including a first transparent substrate 121, a first transparent conductive layer 122, an ion storage layer 123, an ion transfer layer 124, an electrochromic layer 125, a second transparent conductive layers 126 and a second transparent substrate 127 stacked in sequence.

The curvature of the electrochromic aperture was identical to the curvature of convex lens surface in an achromatic lens combination; the second transparent conductive layer 126 was etched with a plurality of annular recesses centering on the central axis of the electrochromic aperture; the thickness of the electrochromic layer 125 gradually increased from inside to outside.

The structure of the aperture-lens combination is shown in FIG. 13, including the achromatic lens combination and the cambered electrochromic aperture 132 provided in this example. The achromatic lens combination includes a convex lens 131 and a concave lens 133. The cambered electrochromic aperture 132 was attached to the surface of the convex lens 131 through optical glue such as OCA or LOCA.

The preparation method of the cambered electrochromic aperture in this example is described below.

(1) Preparation of the Electrochromic Layer 125

500 mg of poly(3-dodecyl)thiophene (PDT) was dissolved in 10 mL of o-xylene; after magnetically stirring for 10 h, the obtained solution was dropped onto an ITO layer (the second transparent conductive layer 126) deposited on a PET substrate (the second transparent substrate 127), and dispensed by spin coating to form a PDT coating (the electrochromic layer 125); the electrochromic layer 125 was etched by laser, with an etching degree gradually decreased from inside to outside, to form a structure with gradually increased thickness from inside to outside; then on the electrochromic layer 125 and on the second transparent conductive layer 126, nine annular recesses were etched by laser centering on the central axis of the electrochromic aperture.

(2) Preparation of the Ion Storage Layer 123

500 mg of tungsten trioxide was dissolved in 20 mL of deionized water; after stirring and filtration, the obtained solution was dropped onto an ITO layer (the first transparent conductive layer 122) deposited on a PET substrate (the first transparent substrate 121), and dispensed by spin coating to form a tungsten trioxide coating, that is, the ion storage layer 123.

(3) Preparation of the Electrochromic Aperture 5 wt % of lithium perchlorate, 94.9 wt % of Polymer G and 0.1 wt % of tert-butyl peroxyneodecanoate were mixed and coated on the ion storage layer 13 described above to form an electrolyte coating; then the electrochromic layer 125 described above (together with the ITO layer and the glass substrate) was covered on the electrolyte coating, and the electrolyte coating was subjected to ultraviolet curing to form an all-solid polymer electrolyte (the ion transfer layer 124), so as to obtain the electrochromic aperture.

(4) Preparation of the Cambered Electrochromic Aperture

The convex lens surface was attached with an OCA layer, and then the electrochromic aperture was attached to the OCA to be fixed, so as to obtain the cambered electrochromic aperture.

Since the electrochromic aperture provided in this example had a characteristic of flexibility, it could be designed as a cambered structure with the same curvature as the convex lens in the achromatic lens combination, so as to achieve the combination of aperture and lens in the lens module and reduce the thickness of the lens module.

Example 6-2

This example provides a cambered electrochromic aperture and an aperture-lens combination.

In this example, the cambered electrochromic aperture differs from Example 6-1 in that its curvature was identical to the curvature of concave lens surface in an achromatic lens combination; the preparation method differs from Example 6-1 in that in step (4), the electrochromic aperture was attached to the concave lens surface with OCA, so as to obtain the cambered electrochromic aperture.

The structure of the aperture-lens combination is shown in FIG. 14, including an achromatic lens combination and a cambered electrochromic aperture 142 provided in this example. The achromatic lens combination includes a convex lens 141 and a concave lens 143. The cambered electrochromic aperture 142 was attached to the surface of concave lens 143 through the OCA optical glue.

Since the electrochromic aperture provided in this example had a characteristic of flexibility, it could be designed as a cambered structure with the same curvature as the concave lens in the achromatic lens combination, so as to achieve the combination of aperture and lens in the lens module and reduce the thickness of the lens module.

Example 6-3

This example provides a cambered electrochromic aperture and an aperture-lens combination.

In this example, the cambered electrochromic aperture differs from Example 6-1 in that its shape was identical to the shape of concave lens in an achromatic lens combination.

The structure of the aperture-lens combination is shown in FIG. 15, including a combination of a convex lens 151 and a concave lens 152 for achromatism, and a holder 153, and the concave lens 152 was clamped on the holder 153; and the concave lens 152 was the cambered electrochromic aperture provided in this example.

Since the electrochromic aperture provided in this example had a characteristic of flexibility, the electrochromic aperture could be designed to have the same shape as the concave lens in the achromatic lens combination, replacing the concave lens in the achromatic lens combination, so as to achieve the combination of aperture and lens in the lens module and reduce the thickness of the lens module.

Example 6-4

This example provides a cambered electrochromic aperture and an aperture-lens combination.

In this example, the cambered electrochromic aperture differs from Example 6-1 in that its shape was identical to the shape of a convex lens in an achromatic lens combination.

The structure of the aperture-lens combination is shown in FIG. 15, including a combination of a convex lens 162 and a concave lens 163 for achromatism, and a holder 161, and the convex lens 162 was clipped on the holder 161; and the convex lens 162 was the cambered electrochromic aperture provided in this example.

Since the electrochromic aperture provided in this example had a characteristic of flexibility, the electrochromic aperture could be designed to have the same shape as the convex lens in the achromatic lens combination, replacing the concave lens in the achromatic lens combination, so as to achieve the combination of aperture and lens in the lens module and reduce the thickness of the lens module.

It should be noted that the function of the voltage driver in the drawings of the present application is to provide a driving voltage, which is only used to easily explain the operating principle of the electrochromic aperture, and should not be construed as a component of the electrochromic aperture.

The applicant has stated that the description hereinabove is only the specific embodiment of the present application, and the protection scope of the present application is not limited by that. It should be apparent to those skilled in the art that any variations or replacements, which are obvious for those skilled in the art to make without departing from the technical scope disclosed by the present application, all fall in the protection extent and disclosure scope of the present application.

What is claimed is:

1. An electrochromic aperture, comprising a first transparent substrate, a first transparent conductive layer, an ion storage layer, an ion transfer layer, an electrochromic layer, a second transparent conductive layer and a second transparent substrate stacked in sequence, wherein the ion transfer layer is a solid electrolyte layer;
    wherein the electrochromic aperture has an identical material from inside to outside, and the electrochromic aperture has no recess, and
    the electrochromic aperture is subjected to a multi-level control by a method comprising the following one: applying different voltages at the center and the edge of the electrochromic aperture, and the voltage at the center is greater than the voltage at the edge, so as to achieve the multi-level control.

2. The electrochromic aperture according to claim 1, wherein the electrochromic aperture has a cambered structure, and a curvature of electrochromic aperture is identical to the curvature of a surface of a concave lens or a convex lens in an achromatic lens combination; or a shape of the electrochromic aperture is identical to the shape of the concave lens or convex lens in the achromatic lens combination.

3. The electrochromic aperture according to claim 1, wherein a thickness of the electrochromic layer or a thickness of the electrochromic layer and the ion storage layer gradually increases from inside to outside.

4. The electrochromic aperture according to claim 1, wherein the first transparent conductive layer and the second transparent conductive layer are each independently made from indium-tin oxide, aluminum zinc oxide, fluorine doped tin oxide, silver nanowire, graphene, carbon nanotube, metal mesh transparent conductive electrode or silver nanoparticle;
    wherein a thickness of the first transparent conductive layer and a thickness of the second transparent conductive layer are each independently selected from 1 nm to 1000 nm;
    wherein a material of the ion storage layer is selected from one or a combination of at least two of oxides or complexes formed from a metal element in groups IIIB, IVB, VB, VIB, VIIB, VIII, IB and IIB, which can store ions during electrochemical reaction;
    wherein the metal is selected from Ti, V, Nb, Ta, Cr, Mo, W, Mn, Fe, Co, Ir, Ni, Cu and Zn;
    wherein the complex is selected from one or a combination of at least two of Prussian green, Prussian white, Prussian brown, Prussian blue, $KFeFe(CN)_6$, FeNiHCF, FeHCF, NiHCF or an iron compound of $X_mY_n\{Fe(CN)_6\}$, wherein X is $Na^+$ or $K^+$ and Y is $Fe^{3+}$, $Co^{3+}$, $Ni^+$, $Mn^{2+}$, $Zn^{2+}$ or $Cu^{2+}$;

wherein the material of the ion storage layer further comprises a redox-active polymer;

wherein a thickness of the ion storage layer is selected from 1 nm to 10000 nm.

5. An aperture-lens combination, comprising:
a combination of concave lens and convex lens for achromatism, and the electrochromic aperture according to claim 2 attached to the surface of the concave lens or convex lens;

or, comprising:
a combination of concave lens and convex lens for achromatism, wherein the concave lens or convex lens is the electrochromic aperture according to claim 2.

6. A lens module, comprising:
an achromatic lens combination, the electrochromic aperture according to claim 4, an exposure controller, an image sensor, a pulse voltage controller, a light intensity sensor, a photosensitive element, a circuit board and a chip;

wherein the centers of the achromatic lens combination, the electrochromic aperture, the exposure controller and the image sensor are on the same optical axis.

7. The electrochromic aperture according to claim 1, wherein a composition of the ion transfer layer comprises an organic salt and/or an inorganic salt, and a polymer;

wherein the inorganic salt is selected from one or a combination of at least two of lithium salt, sodium salt, potassium salt, magnesium salt, calcium salt and aluminum salt;

wherein the organic salt is an ionic liquid;

wherein the ion transfer layer is a solid flexible electrolyte layer;

wherein a neutral small organic molecule contained in the ion transfer layer has a weight percentage of less than or equal to 30 wt %, and the neutral small organic molecule has a molecular weight of less than or equal to 3000;

wherein a thickness of the ion transfer layer is selected from 0.1 μm to 200 μm.

8. The electrochromic aperture according to claim 1, wherein a polymer of the solid electrolyte layer is a solid electrolyte polymer, and the solid electrolyte polymer has plasticized groups linked by covalent bond;

wherein the solid electrolyte polymer is a copolymer of a monomer and an ion conducting polymer or a copolymer of an oligomer and an ion conducting polymer, wherein the monomer or the oligomer has plasticizable groups on the side chain; furthermore, a composition of the solid electrolyte layer further comprises a monomer or an oligomer fragment with a cross-linking group on the side chain;

wherein the solid electrolyte polymer is a plasticized linear polymer and an ion conducting polymer, the two of which are linked by chemical bonds; the plasticized linear polymer has a glass transition temperature of less than −20° C.; furthermore, the composition of the solid electrolyte layer further comprises a monomer or a polymer with a cross-linking group on the side chain; the three, including the monomer or polymer with a cross-linking group on the side chain, the plasticized linear polymer and the ion conducting polymer, are linked by chemical bonds;

wherein the solid electrolyte polymer is a polymer with a plasticized group on the side chain, which has a glass transition temperature of less than −20° C., and an ion conducting polymer, the two of which are linked by chemical bonds; furthermore, the composition of the solid electrolyte layer further comprises a monomer or a polymer with a cross-linking group on the side chain; the three, including the monomer or polymer with a cross-linking group on the side chain, the polymer with a plasticized group on the side chain and a glass transition temperature of less than −20° C. and the ion conducting polymer, are linked by chemical bonds;

wherein the solid electrolyte polymer is a brush polymer, wherein the brush polymer has a soft main polymer chain, an ion conducting side chain and an non-miscible phase side chain; furthermore, the composition of the solid electrolyte layer further comprises a monomer or a oligomer with a cross-linking group on the side chain, wherein the monomer or the oligomer with a cross-linking group on the side chain is linked with the brush polymer by chemical bonds in the form of block copolymerization.

9. The electrochromic aperture according to claim 1, wherein a material of the electrochromic layer is selected from one or a combination of at least two of electrochromic metal oxide, poly(decylviologen) and its derivative, polyaniline and its derivative, polypyrrole and its derivative, polythiophene and its derivative, poly(3,4-ethylenedioxythiophene) and its derivative, polythieno[3,4-b][1,4]dioxepane and its derivative, polyfuran and its derivative, polyfluorene and its derivative and polycarbazole and its derivative, and/or, a copolymer formed from a monomer or an oligomer of the above polymers and an electron deficient monomer;

wherein the monomer having an electron deficient group is selected from one or a combination of at least two of benzothiadiazole, benzoselenadiazole, benzoxazole, benzotriazole, benzimidazole, quinoxaline and diketopyrrolopyrrole;

wherein a thickness of the electrochromic layer is selected from 1 nm to 10000 nm.

10. The electrochromic aperture according to claim 1, wherein a material of the first transparent substrate and a material of the second transparent substrate are each independently selected from glass or flexible substrate material;

wherein the flexible substrate material is selected from PET, cyclic olefin copolymer or cellulose triacetate; and wherein a total thickness of the electrochromic aperture is less than or equal to 5 mm.

11. A lens module, comprising:
the aperture-lens combination according to claim 9, an exposure controller, an image sensor, a pulse voltage controller, a light intensity sensor, a photosensitive element, a circuit board and a chip;

wherein the centers of the aperture-lens combination, the electrochromic aperture, the exposure controller and the image sensor are on the same optical axis.

12. An electrochromic aperture, comprising a first transparent substrate, a first transparent conductive layer, an ion storage layer, an ion transfer layer, an electrochromic layer, a second transparent conductive layer and a second transparent substrate stacked in sequence, wherein the ion transfer layer is a solid electrolyte layer, wherein the electrochromic aperture has an onset bright-transition voltage gradually increasing from inside to outside or an onset dark-transition voltage gradually decreasing from inside to outside;

the ion transfer layer has a cross-linking degree gradually increasing from inside to outside; or from inside to outside, the electrochromic layer has different electrochromic materials and from inside to outside, an onset bright-transition voltage of the electrochromic materials gradually increased or an onset dark-transition voltage of the electrochromic materials gradually decreased.

13. The electrochromic aperture of claim 12, wherein the electrochromic aperture has a cambered structure, and a curvature of electrochromic aperture is identical to the curvature of a surface of a concave lens or a convex lens in an achromatic lens combination; or a shape of the electrochromic aperture is identical to the shape of the concave lens or convex lens in the achromatic lens combination.

14. An aperture-lens combination, comprising:
a combination of concave lens and convex lens for achromatism, and the electrochromic aperture according to claim 13 attached to the surface of the concave lens or convex lens;
or, comprising:
a combination of concave lens and convex lens for achromatism, wherein the concave lens or convex lens is the electrochromic aperture according to claim 13.

15. A lens module, comprising:
the aperture-lens combination according to claim 14, an exposure controller, an image sensor, a pulse voltage controller, a light intensity sensor, a photosensitive element, a circuit board and a chip;
wherein the centers of the aperture-lens combination, the electrochromic aperture, the exposure controller and the image sensor are on the same optical axis.

16. The electrochromic aperture of claim 12, wherein a thickness of the electrochromic layer or a thickness of the electrochromic layer and the ion storage layer gradually increases from inside to outside.

17. The electrochromic aperture of claim 12, wherein the first transparent conductive layer and the second transparent conductive layer are each independently made from indium-tin oxide, aluminum zinc oxide, fluorine doped tin oxide, silver nanowire, graphene, carbon nanotube, metal mesh transparent conductive electrode or silver nanoparticle;
wherein a thickness of the first transparent conductive layer and a thickness of the second transparent conductive layer are each independently selected from 1 nm to 1000 nm;
wherein a material of the ion storage layer is selected from one or a combination of at least two of oxides or complexes formed from a metal element in groups IIIB, IVB, VB, VIB, VIIB, VIII, IB and IIB, which can store ions during electrochemical reaction;
wherein the metal is selected from Ti, V, Nb, Ta, Cr, Mo, W, Mn, Fe, Co, Ir, Ni, Cu and Zn;
wherein the complex is selected from one or a combination of at least two of Prussian green, Prussian white, Prussian brown, Prussian blue, $KFeFe(CN)_6$, FeNiHCF, FeHCF, NiHCF or an iron compound of $XmYn\{Fe(CN)6\}$, wherein X is $Na+$ or $K+$ and Y is $Fe3+$, $Co3+$, $Ni+$, $Mn2+$, $Zn2+$ or $Cu2+$;
wherein the material of the ion storage layer further comprises a redox-active polymer;
wherein a thickness of the ion storage layer is selected from 1 nm to 10000 nm.

18. A lens module, comprising:
an achromatic lens combination, the electrochromic aperture according to claim 17, an exposure controller, an image sensor, a pulse voltage controller, a light intensity sensor, a photosensitive element, a circuit board and a chip;
wherein the centers of the achromatic lens combination, the electrochromic aperture, the exposure controller and the image sensor are on the same optical axis.

19. The electrochromic aperture of claim 12, wherein a composition of the ion transfer layer comprises an organic salt and/or an inorganic salt, and a polymer;
wherein the inorganic salt is selected from one or a combination of at least two of lithium salt, sodium salt, potassium salt, magnesium salt, calcium salt and aluminum salt;
wherein the organic salt is an ionic liquid;
wherein the ion transfer layer is a solid flexible electrolyte layer;
wherein a neutral small organic molecule contained in the ion transfer layer has a weight percentage of less than or equal to 30 wt %, and the neutral small organic molecule has a molecular weight of less than or equal to 3000;
wherein a thickness of the ion transfer layer is selected from 0.1 μm to 200 μm.

20. The electrochromic aperture of claim 12, wherein a polymer of the solid electrolyte layer is a solid electrolyte polymer, and the solid electrolyte polymer has plasticized groups linked by covalent bond;
wherein the solid electrolyte polymer is a copolymer of a monomer and an ion conducting polymer or a copolymer of an oligomer and an ion conducting polymer, wherein the monomer or the oligomer has plasticizable groups on the side chain; furthermore, a composition of the solid electrolyte layer further comprises a monomer or an oligomer fragment with a cross-linking group on the side chain;
wherein the solid electrolyte polymer is a plasticized linear polymer and an ion conducting polymer, the two of which are linked by chemical bonds; the plasticized linear polymer has a glass transition temperature of less than −20° C.; furthermore, the composition of the solid electrolyte layer further comprises a monomer or a polymer with a cross-linking group on the side chain; the three, including the monomer or polymer with a cross-linking group on the side chain, the plasticized linear polymer and the ion conducting polymer, are linked by chemical bonds;
wherein the solid electrolyte polymer is a polymer with a plasticized group on the side chain, which has a glass transition temperature of less than −20° C., and an ion conducting polymer, the two of which are linked by chemical bonds; furthermore, the composition of the solid electrolyte layer further comprises a monomer or a polymer with a cross-linking group on the side chain; the three, including the monomer or polymer with a cross-linking group on the side chain, the polymer with a plasticized group on the side chain and a glass transition temperature of less than −20° C. and the ion conducting polymer, are linked by chemical bonds;
wherein the solid electrolyte polymer is a brush polymer, wherein the brush polymer has a soft main polymer chain, an ion conducting side chain and an non-miscible phase side chain; furthermore, the composition of the solid electrolyte layer further comprises a monomer or a oligomer with a cross-linking group on the side chain, wherein the monomer or the oligomer with a cross-linking group on the side chain is linked with the brush polymer by chemical bonds in the form of block copolymerization.

21. The electrochromic aperture of claim 12, wherein a material of the electrochromic layer is selected from one or a combination of at least two of electrochromic metal oxide, poly(decylviologen) and its derivative, polyaniline and its derivative, polypyrrole and its derivative, polythiophene and its derivative, poly(3,4-ethylenedioxythiophene) and its derivative, polythieno[3,4-b][1,4]dioxepane and its derivative, polyfuran and its derivative, polyfluorene and its derivative and polycarbazole and its derivative, and/or, a copolymer formed from a monomer or an oligomer of the above polymers and an electron deficient monomer;
wherein the monomer having an electron deficient group is selected from one or a combination of at least two of benzothiadiazole, benzoselenadiazole, benzoxazole, benzotriazole, benzimidazole, quinoxaline and diketopyrrolopyrrole;
wherein a thickness of the electrochromic layer is selected from 1 nm to 10000 nm.

22. The electrochromic aperture of claim 12, wherein a material of the first transparent substrate and a material of the second transparent substrate are each independently selected from glass or flexible substrate material;
wherein the flexible substrate material is selected from PET, cyclic olefin copolymer or cellulose triacetate; and
wherein a total thickness of the electrochromic aperture is less than or equal to 5 mm.

23. An electrochromic aperture, comprising a first transparent substrate, a first transparent conductive layer, an ion storage layer, an ion transfer layer, an electrochromic layer, a second transparent conductive layer and a second transparent substrate stacked in sequence, wherein the ion transfer layer is a solid electrolyte layer, wherein
a) on the ion storage layer and the first transparent conductive layer, and/or on the electrochromic layer and the second transparent conductive layer, a plurality of annular recesses are etched centering on the central axis of the electrochromic aperture;
or
b) on the three layers including the first transparent substrate, the first transparent conductive layer and the ion storage layer, a plurality of annular recesses are etched centering on the central axis of the electrochromic aperture;
and/or
on the three layers including the second transparent substrate, the second transparent conductive layer and the electrochromic layer, a plurality of annular recesses are etched centering on the central axis of the electrochromic aperture.

24. The electrochromic aperture of claim 23, wherein the electrochromic aperture has a cambered structure, and a curvature of electrochromic aperture is identical to the curvature of a surface of a concave lens or a convex lens in an achromatic lens combination; or a shape of the electrochromic aperture is identical to the shape of the concave lens or convex lens in the achromatic lens combination.

25. The electrochromic aperture of claim 23, wherein a thickness of the electrochromic layer or a thickness of the electrochromic layer and the ion storage layer gradually increases from inside to outside;
a shape of the electrochromic aperture is identical to the shape of the concave lens or convex lens in the achromatic lens combination.

26. An aperture-lens combination, comprising:
a combination of concave lens and convex lens for achromatism, and the electrochromic aperture according to claim 25 attached to the surface of the concave lens or convex lens;
or, comprising:
a combination of concave lens and convex lens for achromatism, wherein the concave lens or convex lens is the electrochromic aperture according to claim 25.

27. A lens module, comprising:
the aperture-lens combination according to claim 26, an exposure controller, an image sensor, a pulse voltage controller, a light intensity sensor, a photosensitive element, a circuit board and a chip;
wherein the centers of the aperture-lens combination, the electrochromic aperture, the exposure controller and the image sensor are on the same optical axis.

28. The electrochromic aperture of claim 23, wherein the first transparent conductive layer and the second transparent conductive layer are each independently made from indium-tin oxide, aluminum zinc oxide, fluorine doped tin oxide, silver nanowire, graphene, carbon nanotube, metal mesh transparent conductive electrode or silver nanoparticle;
wherein a thickness of the first transparent conductive layer and a thickness of the second transparent conductive layer are each independently selected from 1 nm to 1000 nm;
wherein a material of the ion storage layer is selected from one or a combination of at least two of oxides or complexes formed from a metal element in groups IIIB, IVB, VB, VIB, VIIB, VIII, IB and IIB, which can store ions during electrochemical reaction;
wherein the metal is selected from Ti, V, Nb, Ta, Cr, Mo, W, Mn, Fe, Co, Ir, Ni, Cu and Zn;
wherein the complex is selected from one or a combination of at least two of Prussian green, Prussian white, Prussian brown, Prussian blue, $KFeFe(CN)_6$, FeNiHCF, FeHCF, NiHCF or an iron compound of $X_mY_n\{Fe(CN)6\}$, wherein X is Na+ or K+ and Y is Fe3+, Co3+, Ni+, Mn2+, Zn2+ or Cu2+;
wherein the material of the ion storage layer further comprises a redox-active polymer;
wherein a thickness of the ion storage layer is selected from 1 nm to 10000 nm.

29. A lens module, comprising:
an achromatic lens combination, the electrochromic aperture according to claim 28, an exposure controller, an image sensor, a pulse voltage controller, a light intensity sensor, a photosensitive element, a circuit board and a chip;
wherein the centers of the achromatic lens combination, the electrochromic aperture, the exposure controller and the image sensor are on the same optical axis.

30. The electrochromic aperture of claim 23, wherein a composition of the ion transfer layer comprises an organic salt and/or an inorganic salt, and a polymer;
wherein the inorganic salt is selected from one or a combination of at least two of lithium salt, sodium salt, potassium salt, magnesium salt, calcium salt and aluminum salt;
wherein the organic salt is an ionic liquid;
wherein the ion transfer layer is a solid flexible electrolyte layer;
wherein a neutral small organic molecule contained in the ion transfer layer has a weight percentage of less than or equal to 30 wt %, and the neutral small organic molecule has a molecular weight of less than or equal to 3000;

wherein a thickness of the ion transfer layer is selected from 0.1 μm to 200 μm.

31. The electrochromic aperture of claim 23, wherein a polymer of the solid electrolyte layer is a solid electrolyte polymer, and the solid electrolyte polymer has plasticized groups linked by covalent bond;

wherein the solid electrolyte polymer is a copolymer of a monomer and an ion conducting polymer or a copolymer of an oligomer and an ion conducting polymer, wherein the monomer or the oligomer has plasticizable groups on the side chain; furthermore, a composition of the solid electrolyte layer further comprises a monomer or an oligomer fragment with a cross-linking group on the side chain;

wherein the solid electrolyte polymer is a plasticized linear polymer and an ion conducting polymer, the two of which are linked by chemical bonds; the plasticized linear polymer has a glass transition temperature of less than −20° C.; furthermore, the composition of the solid electrolyte layer further comprises a monomer or a polymer with a cross-linking group on the side chain; the three, including the monomer or polymer with a cross-linking group on the side chain, the plasticized linear polymer and the ion conducting polymer, are linked by chemical bonds;

wherein the solid electrolyte polymer is a polymer with a plasticized group on the side chain, which has a glass transition temperature of less than −20° C., and an ion conducting polymer, the two of which are linked by chemical bonds; furthermore, the composition of the solid electrolyte layer further comprises a monomer or a polymer with a cross-linking group on the side chain; the three, including the monomer or polymer with a cross-linking group on the side chain, the polymer with a plasticized group on the side chain and a glass transition temperature of less than −20° C. and the ion conducting polymer, are linked by chemical bonds;

wherein the solid electrolyte polymer is a brush polymer, wherein the brush polymer has a soft main polymer chain, an ion conducting side chain and an non-miscible phase side chain; furthermore, the composition of the solid electrolyte layer further comprises a monomer or a oligomer with a cross-linking group on the side chain, wherein the monomer or the oligomer with a cross-linking group on the side chain is linked with the brush polymer by chemical bonds in the form of block copolymerization.

32. The electrochromic aperture of claim 23, wherein a material of the electrochromic layer is selected from one or a combination of at least two of electrochromic metal oxide, poly(decylviologen) and its derivative, polyaniline and its derivative, polypyrrole and its derivative, polythiophene and its derivative, poly(3,4-ethylenedioxythiophene) and its derivative, polythieno[3,4-b][1,4]dioxepane and its derivative, polyfuran and its derivative, polyfluorene and its derivative and polycarbazole and its derivative, and/or, a copolymer formed from a monomer or an oligomer of the above polymers and an electron deficient monomer;

wherein the monomer having an electron deficient group is selected from one or a combination of at least two of benzothiadiazole, benzoselenadiazole, benzoxazole, benzotriazole, benzimidazole, quinoxaline and diketopyrrolopyrrole;

wherein a thickness of the electrochromic layer is selected from 1 nm to 10000 nm.

33. The electrochromic aperture of claim 23, wherein a material of the first transparent substrate and a material of the second transparent substrate are each independently selected from glass or flexible substrate material;

wherein the flexible substrate material is selected from PET, cyclic olefin copolymer or cellulose triacetate; and wherein a total thickness of the electrochromic aperture is less than or equal to 5 mm.

34. A preparation method of the electrochromic aperture according to claim 23, comprising the following steps:

(1) forming the first transparent conductive layer on the first transparent substrate, and forming the second transparent conductive layer on the second transparent substrate;

(2) forming the ion storage layer on the first transparent conductive layer, and forming the electrochromic layer on the second transparent conductive layer;

(3) on the ion storage layer and the first transparent conductive layer, and/or on the electrochromic layer and the second transparent conductive layer, a plurality of annular recesses are etched centering on the central axis of the electrochromic aperture; and (4) combining the ion storage layer, the electrochromic layer and the ion transfer layer, and arranging the ion transfer layer between the ion storage layer and the electrochromic layer, so that the electrochromic aperture is obtain;

or, comprising the following steps:

(1) forming the first transparent conductive layer on the first transparent substrate, and forming the second transparent conductive layer on the second transparent substrate;

(2) forming the ion storage layer on the first transparent conductive layer, and forming the electrochromic layer on the second transparent conductive layer;

(3) combining the ion storage layer, the electrochromic layer and the ion transfer layer, and arranging the ion transfer layer between the ion storage layer and the electrochromic layer; and (4) performing etching on the side of the first transparent substrate; on the two layers including the first transparent substrate and the first transparent conductive layer, or on the three layers including the first transparent substrate, the first transparent conductive layer and the ion storage layer, etching out a plurality of annular recesses centering on the central axis of the electrochromic aperture;

and/or performing etching on the side of the second transparent substrate; on the two layers including the second transparent substrate and the second transparent conductive layer, or on the three layers including the second transparent substrate, the second transparent conductive layer and the electrochromic layer, etching out a plurality of annular recesses centering on the central axis of the electrochromic aperture.

* * * * *